US010516994B2

(12) United States Patent
Lee et al.

(10) Patent No.: US 10,516,994 B2
(45) Date of Patent: Dec. 24, 2019

(54) AUTHENTICATION WITH PRIVACY IDENTITY

(71) Applicant: QUALCOMM Incorporated, San Diego, CA (US)

(72) Inventors: Soo Bum Lee, San Diego, CA (US); Anand Palanigounder, San Diego, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 15/449,079

(22) Filed: Mar. 3, 2017

(65) Prior Publication Data
US 2018/0020351 A1    Jan. 18, 2018

Related U.S. Application Data

(60) Provisional application No. 62/363,289, filed on Jul. 17, 2016.

(51) Int. Cl.
*H04W 12/06* (2009.01)
*H04L 9/08* (2006.01)
(Continued)

(52) U.S. Cl.
CPC .......... *H04W 12/06* (2013.01); *H04L 9/0822* (2013.01); *H04L 9/14* (2013.01); *H04L 61/1547* (2013.01);
(Continued)

(58) Field of Classification Search
CPC ..... H04W 12/06; H04W 12/02; H04W 12/04; H04W 12/08; H04W 76/10; H04W 8/04;
(Continued)

(56) References Cited

U.S. PATENT DOCUMENTS

2012/0263298 A1* 10/2012 Suh ................ H04W 12/04
  380/255
2013/0170643 A1* 7/2013 Xiao ................ H04L 63/08
  380/270
(Continued)

FOREIGN PATENT DOCUMENTS

WO    WO-2016017886 A1    2/2016

OTHER PUBLICATIONS

3rd Generation Partnership Project; Technical Specification Group Core Network and Terminals; Characteristics of the Universal Subscriber Identity Module (USIM) application (Release 13), 3GPP TS 31.102, V13.4.0, Jun. 2016, XP051123189, 276 pages.
(Continued)

*Primary Examiner* — Khalil Naghdali
(74) *Attorney, Agent, or Firm* — Linda G. Gunderson; Holland & Hart LLP

(57) ABSTRACT

Methods, systems, and devices for wireless communication are described. A user equipment (UE) may perform authentication procedures using an alternative identity (e.g., a privacy mobile subscriber identity (PMSI)) instead of an international mobile subscriber identity (IMSI) to protect the privacy of the user. If the UE does not have a PMSI, it may include a request for a PMSI initialization in an attach request. In some cases, the PMSI may be used once, and a new PMSI may be generated for the next attachment procedure. In some cases, a universal subscriber identity module (USIM) of the UE may not support storage of a PMSI. So a privacy module of the UE may communicate with the USIM according to the USIM's capabilities and may maintain a PMSI separately for communication with the network.

19 Claims, 19 Drawing Sheets

(51) Int. Cl.
| | |
|---|---|
| *H04L 9/14* | (2006.01) |
| *H04L 29/12* | (2006.01) |
| *H04L 29/06* | (2006.01) |
| *H04W 12/02* | (2009.01) |
| *H04W 8/04* | (2009.01) |
| *H04W 12/04* | (2009.01) |
| *H04W 12/08* | (2009.01) |
| *H04W 76/10* | (2018.01) |
| *H04W 8/26* | (2009.01) |
| *H04W 60/00* | (2009.01) |
| *H04W 12/00* | (2009.01) |

(52) U.S. Cl.
CPC ........ *H04L 63/0407* (2013.01); *H04L 63/083* (2013.01); *H04L 63/0876* (2013.01); *H04L 63/0892* (2013.01); *H04W 8/04* (2013.01); *H04W 12/02* (2013.01); *H04W 12/04* (2013.01); *H04W 12/08* (2013.01); *H04W 76/10* (2018.02); H04L 61/6054 (2013.01); H04L 2209/80 (2013.01); *H04W 8/26* (2013.01); *H04W 12/00514* (2019.01); *H04W 12/00518* (2019.01); *H04W 60/00* (2013.01)

(58) Field of Classification Search
CPC ..... H04L 9/0822; H04L 9/14; H04L 61/1547; H04L 61/6054; H04L 63/0407; H04L 63/083; H04L 63/0876; H04L 63/0892; H04L 2209/80
USPC ........................................................ 380/249
See application file for complete search history.

(56) References Cited

U.S. PATENT DOCUMENTS

| | | | | |
|---|---|---|---|---|
| 2014/0098957 | A1* | 4/2014 | Larsson | ................ H04L 63/08 |
| | | | | 380/270 |
| 2017/0055149 | A1* | 2/2017 | Lehtovirta | ............ H04W 12/04 |
| 2017/0195877 | A1* | 7/2017 | Lehtovirta | ............ H04W 12/04 |
| 2017/0366388 | A1* | 12/2017 | Begeer | ............. H04L 29/06952 |

OTHER PUBLICATIONS

QUALCOMM: "Architectural Considerations due to UE Privacy for V2X Operation", 3GPP Draft; S2-161628 V2X SECURITY_R7, 3rd Generation Partnership Project (3GPP), Mobile Competence Centre; 650, Route Des Lucioles; F-06921 Sophia-Antipolis Cedex, vol. SA WG2, No. Sophia Antipolis, France; Apr. 5, 2016, XP051086601, Retrieved from the Internet: URL:http://www.3gpp.org/ftp/tsg_sa/WG2__Arch/TSGS2_114_Sophia_Antipolis/Docs/ [retrieved on Apr. 5, 2016], 7 pages.

IPEA/EP, Second Written Opinion of the International Preliminary Examining Authority, Int'l Application No. PCT/US2017/037965, dated Jun. 25, 2018, European Patent Office, Munich, DE, 7 pgs.

Broek et al., "Defeating IMSI Catchers," Proceedings of the 22nd ACM SIGSAC Conference: On Computer and Communications Security, CCS '15, Aug. 19, 2015, 12 pgs., XP055340387, DOI: 10.1145/2810103. 2813615 ISBN: 978-1-4503-3832-5, New York, New York, USA.

ISA/EP, International Search Report and Written Opinion of the International Searching Authority, Int'l Application No. PCT/US2017/037965, dated Aug. 11, 2017, European Patent Office, Rijswijk, NL, 16 pgs.

Norrman et al, "Protecting IMSI and User Privacy In 5G Networks," Proceedings of the 9th International Conference on Mobile Multimedia Communications, May 30, 2016, 8 pgs., XP055395414, DOI: 10.41 08/eal. Jun. 18, 2016. 2264114, ISBN: 978-1-63190-104-1.

* cited by examiner

AUTHENTICATION WITH PRIVACY IDENTITY

CROSS REFERENCES

The present application for patent claims priority to U.S. Provisional Patent Application No. 62/363,289 by Lee, et al., entitled "Authentication With A Privacy Identity," filed Jul. 17, 2016, assigned to the assignee hereof, and expressly incorporated by reference herein.

BACKGROUND

The following relates generally to wireless communication and more specifically to authentication with a privacy identity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE may perform an authentication procedure in order to establish a connection to a wireless network. The authentication may be based on an identity such as an international mobile subscriber identity (IMSI). Communicating the IMSI to the network may, however, present the risk that a third party may intercept the IMSI, which may compromise the privacy of the user.

SUMMARY

A user equipment (UE) may perform authentication procedures using an identity other than an international mobile subscriber identity (IMSI) (e.g., a privacy mobile subscriber identity (PMSI)) to protect the privacy of the user. If the UE does not have another identity, like a PMSI, it may include a request for an identity initialization in an attach request. In some cases, an alternative or additional mobile subscriber identity, such as a PMSI, may be used once, and a new identity may be generated for the next attachment procedure. In some cases, a universal subscriber identity module (USIM) of the UE may not support storage of an alternative identity. A privacy module of the UE may therefore communicate with the USIM according to the USIM's capabilities, and maintain an alternative identity (e.g., PMSI) separately for communication with the network.

A method of wireless communication is described. The method may include transmitting an attach request comprising an international mobile subscriber identity (IMSI) and an initialization request for an additional mobile subscriber identity, receiving an authentication request in response to the attach request based at least in part on the initialization request for the additional mobile subscriber identity, wherein the authentication request comprises the additional mobile subscriber identity, identifying one or more encryption keys for initialization based at least in part on receiving the authentication request, and transmitting an acknowledgement for the additional mobile subscriber identity in response to the authentication request.

An apparatus for wireless communication is described. The apparatus may include means for transmitting an attach request comprising an IMSI and an initialization request for an additional mobile subscriber identity, means for receiving an authentication request in response to the attach request based at least in part on the initialization request for the additional mobile subscriber identity, wherein the authentication request comprises the additional mobile subscriber identity, means for identifying one or more encryption keys for initialization based at least in part on receiving the authentication request, and means for transmitting an acknowledgement for the additional mobile subscriber identity in response to the authentication request.

Another apparatus for wireless communication is described. The apparatus may include a processor, memory in electronic communication with the processor, and instructions stored in the memory. The instructions may be operable to cause the processor to transmit an attach request comprising an IMSI and an initialization request for an additional mobile subscriber identity, receive an authentication request in response to the attach request based at least in part on the initialization request for the additional mobile subscriber identity, wherein the authentication request comprises the additional mobile subscriber identity, identify one or more encryption keys for initialization based at least in part on receiving the authentication request, and transmit an acknowledgement for the additional mobile subscriber identity in response to the authentication request.

A non-transitory computer readable medium for wireless communication is described. The non-transitory computer-readable medium may include instructions operable to cause a processor to transmit an attach request comprising an IMSI and an initialization request for an additional mobile subscriber identity, receive an authentication request in response to the attach request based at least in part on the initialization request for the additional mobile subscriber identity, wherein the authentication request comprises the additional mobile subscriber identity, identify one or more encryption keys for initialization based at least in part on receiving the authentication request, and transmit an acknowledgement for the additional mobile subscriber identity in response to the authentication request.

Some examples of the method, apparatus, and non-transitory computer-readable medium described above may further include processes, features, means, or instructions for identifying an absence of the additional mobile subscriber identity in a universal subscriber identity module (USIM), wherein the attach request may be transmitted based at least in part on the absence of the additional mobile subscriber identity.

In some examples of the method, apparatus, and non-transitory computer-readable medium described above, the USIM does not support the additional mobile subscriber identity. In some examples of the method, apparatus, and non-transitory computer-readable medium described above, the USIM may be configured for operation according to at least one of Universal Mobile Telecommunications System (UMTS), Long Term Evolution (LTE), or LTE-Advanced (LTE-A). In some examples of the method, apparatus, and non-transitory computer-readable medium described above, the USIM may be configured for operation according to a next generation mobile network or radio access technology (RAT).

Some examples of the method, apparatus, and non-transitory computer-readable medium described above may further include processes, features, means, or instructions for obtaining a master session key. Some examples of the method, apparatus, and non-transitory computer-readable medium described above may further include processes, features, means, or instructions for obtaining an additional master session key and an additional mobile subscriber identity key based at least in part on the master session key. Some examples of the method, apparatus, and non-transitory computer-readable medium described above may further include processes, features, means, or instructions for decrypting the additional mobile subscriber identity based at least in part on the additional mobile subscriber identity key, wherein the acknowledgement may be based at least in part on decrypting the additional mobile subscriber identity.

In some examples of the method, apparatus, and non-transitory computer-readable medium described above, the master session key may be obtained based at least in part on a shared root key of a user equipment (UE) and a network entity.

In some examples of the method, apparatus, and non-transitory computer-readable medium described above, the authentication request comprises a mobile subscriber identity key. Some examples of the method, apparatus, and non-transitory computer-readable medium described above may further include processes, features, means, or instructions for obtaining a master session key. Some examples of the method, apparatus, and non-transitory computer-readable medium described above may further include processes, features, means, or instructions for obtaining an additional master session key and an additional mobile subscriber identity key based at least in part on the master session key. Some examples of the method, apparatus, and non-transitory computer-readable medium described above may further include processes, features, means, or instructions for decrypting the mobile subscriber identity key based at least in part on the additional mobile subscriber identity key. Some examples of the method, apparatus, and non-transitory computer-readable medium described above may further include processes, features, means, or instructions for decrypting the additional mobile subscriber identity based at least in part on the mobile subscriber identity key, wherein the acknowledgement may be based at least in part on decrypting the additional mobile subscriber identity.

In some examples of the method, apparatus, and non-transitory computer-readable medium described above, the authentication request comprises an encrypted version of the mobile subscriber identity key. Some examples of the method, apparatus, and non-transitory computer-readable medium described above may further include processes, features, means, or instructions for obtaining a subsequent version of the additional mobile subscriber identity, wherein the additional mobile subscriber identity may be associated with a first index and the subsequent version of the additional mobile subscriber identity may be associated with a second index.

In some examples of the method, apparatus, and non-transitory computer-readable medium described above, the subsequent version of the additional mobile subscriber identity may be derived from the additional mobile subscriber identity. In some examples of the method, apparatus, and non-transitory computer-readable medium described above, the additional mobile subscriber identity may be a single use identity.

Some examples of the method, apparatus, and non-transitory computer-readable medium described above may further include processes, features, means, or instructions for transmitting a subsequent attach request comprising the additional mobile subscriber identity. Some examples of the method, apparatus, and non-transitory computer-readable medium described above may further include processes, features, means, or instructions for receiving an indication of a temporary mobile subscriber identity (TMSI).

Some examples of the method, apparatus, and non-transitory computer-readable medium described above may further include processes, features, means, or instructions for storing the additional mobile subscriber identity key in a non-volatile memory. In some examples of the method, apparatus, and non-transitory computer-readable medium described above, the additional mobile subscriber identity comprises a privacy mobile subscriber identity (PMSI). In some examples of the method, apparatus, and non-transitory computer-readable medium described above, the authentication request comprises an encrypted version of the additional mobile subscriber identity.

A method of wireless communication is described. The method may include receiving an authentication information request comprising an IMSI and an initialization request for an additional mobile subscriber identity, transmitting an authentication information response based at least in part on the initialization request for the additional mobile subscriber identity, wherein the authentication information response comprises the additional mobile subscriber identity, and receiving an acknowledgement for the additional mobile subscriber identity based at least in part on the authentication information response.

An apparatus for wireless communication is described. The apparatus may include means for receiving an authentication information request comprising an IMSI and an initialization request for an additional mobile subscriber identity, means for transmitting an authentication information response based at least in part on the initialization request for the additional mobile subscriber identity, wherein the authentication information response comprises the additional mobile subscriber identity, and means for receiving an acknowledgement for the additional mobile subscriber identity based at least in part on the authentication information response.

Another apparatus for wireless communication is described. The apparatus may include a processor, memory in electronic communication with the processor, and instructions stored in the memory. The instructions may be operable to cause the processor to receive an authentication information request comprising an IMSI and an initialization request for an additional mobile subscriber identity, transmit an authentication information response based at least in part on the initialization request for the additional mobile subscriber identity, wherein the authentication information response comprises the additional mobile subscriber identity, and receive an acknowledgement for the additional mobile subscriber identity based at least in part on the authentication information response.

A non-transitory computer readable medium for wireless communication is described. The non-transitory computer-readable medium may include instructions operable to cause a processor to receive an authentication information request comprising an IMSI and an initialization request for an additional mobile subscriber identity, transmit an authentication information response based at least in part on the initialization request for the additional mobile subscriber identity, wherein the authentication information response comprises the additional mobile subscriber identity, and receive an acknowledgement for the additional mobile subscriber identity based at least in part on the authentication information response.

Some examples of the method, apparatus, and non-transitory computer-readable medium described above may further include processes, features, means, or instructions for obtaining a master session key. Some examples of the method, apparatus, and non-transitory computer-readable medium described above may further include processes, features, means, or instructions for obtaining an additional master session key and an additional mobile subscriber identity key based at least in part on the master session key. Some examples of the method, apparatus, and non-transitory computer-readable medium described above may further include processes, features, means, or instructions for encrypting the additional mobile subscriber identity based at least in part on the additional mobile subscriber identity key, wherein the authentication information response comprises the encrypted additional mobile subscriber identity and the additional master session key.

Some examples of the method, apparatus, and non-transitory computer-readable medium described above may further include processes, features, means, or instructions for obtaining a master session key. Some examples of the method, apparatus, and non-transitory computer-readable medium described above may further include processes, features, means, or instructions for obtaining an additional master session key, a mobile subscriber identity key, and an additional mobile subscriber identity key based at least in part on the master session key. Some examples of the method, apparatus, and non-transitory computer-readable medium described above may further include processes, features, means, or instructions for encrypting the mobile subscriber identity key based at least in part on the additional mobile subscriber identity key. Some examples of the method, apparatus, and non-transitory computer-readable medium described above may further include processes, features, means, or instructions for encrypting the additional mobile subscriber identity based at least in part on the mobile subscriber identity key, wherein the authentication information response comprises the encrypted mobile subscriber identity key, the encrypted additional mobile subscriber identity, and the additional master session key.

Some examples of the method, apparatus, and non-transitory computer-readable medium described above may further include processes, features, means, or instructions for obtaining a subsequent version of the additional mobile subscriber identity, wherein the additional mobile subscriber identity may be associated with a first index and the subsequent version of the additional mobile subscriber identity may be associated with a second index.

In some examples of the method, apparatus, and non-transitory computer-readable medium described above, the subsequent version of the additional mobile subscriber identity may be derived from the additional mobile subscriber identity. Some examples of the method, apparatus, and non-transitory computer-readable medium described above may further include processes, features, means, or instructions for receiving a subsequent authentication information request comprising the additional mobile subscriber identity.

Some examples of the method, apparatus, and non-transitory computer-readable medium described above may further include processes, features, means, or instructions for receiving an IMSI request comprising the additional mobile subscriber identity. Some examples of the method, apparatus, and non-transitory computer-readable medium described above may further include processes, features, means, or instructions for encrypting the IMSI. Some examples of the method, apparatus, and non-transitory computer-readable medium described above may further include processes, features, means, or instructions for transmitting an IMSI response comprising the additional mobile subscriber identity and the encrypted IMSI.

In some examples of the method, apparatus, and non-transitory computer-readable medium described above, at least a portion of the IMSI request or the IMSI response may be encrypted using an additional master session key. In some examples of the method, apparatus, and non-transitory computer-readable medium described above, the additional mobile subscriber identity comprises a privacy mobile subscriber identity (PMSI).

DETAILED DESCRIPTION

Figure 1:
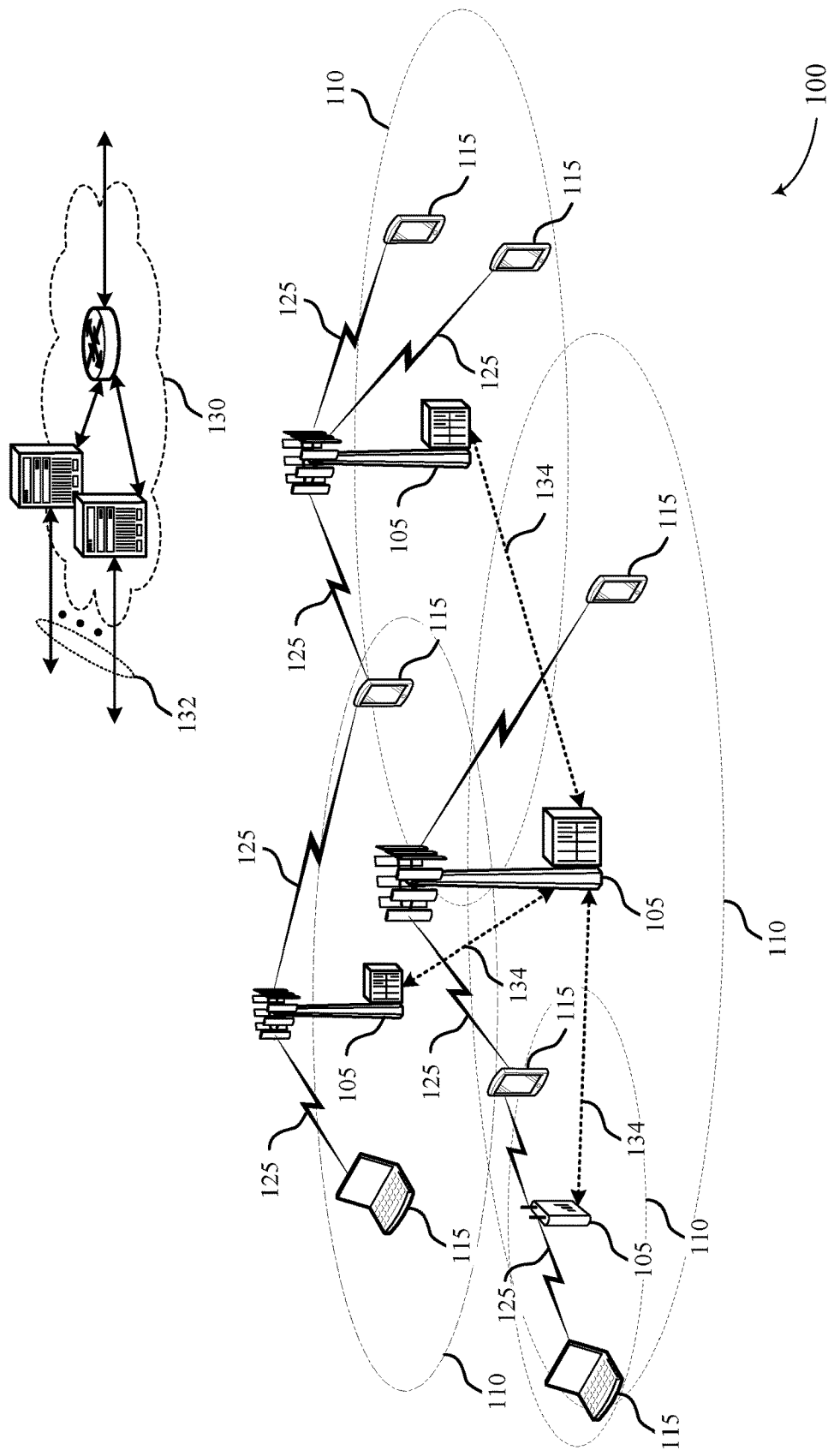
FIGS. 1 and 2 illustrate examples of wireless communications systems that supports authentication with a privacy identity in accordance with aspects of the present disclosure.

The present disclosure provides a secure approach for device authentication, and more specifically relating to authentication with a privacy identity. In one aspect, a user equipment (UE) without a prestored temporary privacy identity may be configured to use a temporary privacy identity for device authentication after performing an initialization procedure at the UE. A UE may perform authentication procedures using an identity that is different from, and alternative to, an international mobile subscriber identity (IMSI) (e.g., a privacy mobile subscriber identity (PMSI)), which may protect the privacy of the user and the UE. Because communicating the IMSI to the network may present the risk that a third party may intercept the IMSI, which may compromise the privacy of the user, the UE may rely on a PMSI or the like. This may limit or avoid the chances that a third party will intercept wireless communications between a UE and a base station or communications within a core network.

By way of example, a UE may perform authentication procedures using an alternative identity, such as a PMSI, instead of the IMSI to protect the privacy of the user. If the UE does not have a PMSI, it may include a request for a PMSI initialization in an attach request. In some cases, the PMSI may be used only once, and a new PMSI may be generated for a subsequent attach. In some cases, a universal subscriber identity module (USIM) of the UE may not support storage of a PMSI. In this case, a privacy module of the UE may communicate with the USIM according to the USIM's capabilities, and maintain a PMSI separately for communication with the network. For example, the privacy module may be implemented in the UE to facilitate authentication using the PMSI if the USIM does not support PMSI.

The UE may use the PMSI when requesting a connection to a network. For example, a network may include a network entity such as a home subscriber server (HSS), an authentication server function (AUSF), or a subscriber database. HSS may be used throughout this disclosure to refer to an HSS, an AUSF, or a subscriber database. The UE may initialize a PMSI during subscriber registration to protect the privacy of the IMSI. That is, two identities, i.e., an IMSI and a PMSI, may be provisioned to a USIM and registered to the network, for example the HSS. In one aspect, the PMSI may be used once per attach request, and a new PMSI may be determined if the UE requests another attach. A PMSI may offer greater privacy than the IMSI because the IMSI may be permanently associated with the USIM, while the PMSI may be temporary and the relationship between the PMSI and IMSI may be protected. In another aspect, the PMSI may be changed after every use. A subsequent or "next" PMSI may be derived based on a current PMSI. In one aspect, the PMSI may also be protected with encryption keys.

In one aspect, when a UE determines that a USIM does not have a PMSI stored, the UE may perform a PMSI initialization procedure (e.g., if the UE is communicating with the USIM for the first time, or if the USIM does not support storage of a PMSI). The UE may perform the PMSI initialization procedure by sending a PMSI initialization indication to a network (e.g., serving network) during the attach. The serving network may then transmit an authentication information request along with the PMSI initialization indication to the HSS.

Upon receiving an authentication information request by the serving network with the PMSI initialization indication, the HSS may prepare an authentication response. The HSS may identify the PMSI and derive one or more encryption keys that may be used for the encryption of a PMSI. The PMSI, and in some cases, the PMSI encryption key(s), may be encrypted and sent to the UE. In some cases, the PMSI index may be encrypted and sent to the UE (e.g., when the PMSI is chosen by the HSS instead of being derived based on the previous PMSI).

Upon receiving the response from the network, the UE may obtain one or more encryption keys from the USIM. The UE may then decrypt the PMSI. In cases where the PMSI index has been sent from the HSS, the PMSI index may also be decrypted and used by the UE to help ensure that the UE and the HSS are synchronized regarding which PMSI is being used. When the UE identifies the PMSI, it may send a PMSI acknowledgement message back to the core network. For example, the UE may send the PMSI acknowledgement to an entity within the core network, such as an HSS.

Aspects of the disclosure introduced above are described below in the context of different illustrations of wireless communications systems that support authentication using a PMSI. A process flow is then used to illustrate the authentication process. Aspects of the disclosure are further illustrated by and described with reference to apparatus diagrams, system diagrams, and flowcharts that relate to authentication with a privacy identity.

FIG. 1 illustrates an example of a wireless communications system 100 in accordance with various aspects of the present disclosure. The wireless communications system 100 includes base stations 105, UEs 115, and a core network entity 130. In some examples, the wireless communications system 100 may be a LTE (or LTE-Advanced) network. In some cases, wireless communications system 100 employs a radio access technology (RAT) that may be referred to as "next-generation" or "5G." Such systems may include some features similar to other RATs, including LTE/LTE-A, but which may operate according to a wireless communications standard that uses resource structures, timing, signaling, or the like that is incompatible with aspects of an LTE/LTE-A system. System 100 may include base stations 105, a core network entity or entities 130, or the like that support LTE/LTE-A and/or 5G operation. System 100 may also support operation according to other wireless communications standards, such as Universal Mobile Telecommunications System (UMTS).

Wireless communications system 100 may support authentication using an additional or alternative mobile subscriber identity. Throughout this disclosure, the additional or alternative mobile subscriber identity may be referred to as a privacy mobile subscriber identity (PMSI). Wireless communications system 100 may also support initialization of the PMSI when one is not stored within a universal subscriber identity module (USIM).

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, etc.

A UE 115 may include a subscriber identity module (SIM) or a universal subscriber identity module (USIM) in order to perform authentication within wireless communications system 100. A SIM or USIM may be an integrated circuit that securely stores the international mobile subscriber identity (IMSI) and a related key used to identify and authenticate the UE 115. A SIM of USIM may also contain a unique serial number (e.g., an integrated circuit card ID (ICCID)), security authentication and ciphering information, temporary information related to the local network, a list of the services, a personal identification number (PIN), and/or a personal unblocking code (PUK) for PIN unlocking. In some cases, a SIM or USIM may be a circuit embedded in a removable plastic card. In some cases, the SIM or USIM may be capable of storing a PMSI and/or one or more keys related to the PMSI to reduce the frequency of communication using the IMSI.

Base stations 105 may communicate with the core network entity 130 and with one another. For example, base stations 105 may interface with the core network entity 130 through backhaul links 132 (e.g., S1, etc.). Base stations 105 may communicate with one another over backhaul links 134

(e.g., X2, etc.) either directly or indirectly (e.g., through core network entity 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some examples, a base station 105 may be connected by an S1 interface to one or more core network entities 130. The core network may be an evolved packet core (EPC), which may include at least one mobility management entity (MME), a security anchor function (SEAF), or a security context management function (SCMF). MME may be used throughout this disclosure to refer to a MME, an SEAF, or a SCMF. In some cases, the core network may include at least one serving gateway (S-GW), and at least one packet data network (PDN) gateway (P-GW). The MME may be the control node that processes the signaling between the UE 115 and the EPC. User Internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS). The one or more core network entities 130 may also include a home subscriber server (HSS) that may be used to verify the identity and access level of a UE 115.

In one aspect, a UE 115 may perform an authentication procedure during initial attachment to wireless communications system 100. For example, a UE 115 may send an attach request (e.g., a non-access stratum (NAS) attach request) following an initial access procedure. The attach request may include an international mobile subscriber identity (IMSI). The attach request may be passed from a base station 105 to an MME, and on to an HSS. The HSS may respond with the information for performing the authentication (e.g., known as an authentication vector). For example, the authentication vector may include an authentication token, a random number, and/or a session key for use in encrypting authentication messages. An authentication request may then be sent back to the UE.

In an alternative aspect, the UE may generate the session key using information stored in a SIM or USIM, and transmit an authentication response. If the authentication response is correct, the MME may send the UE a security mode command (SMC), which may include a confidentiality and integrity algorithm. The UE may then respond with a security mode complete message.

In some examples, a UE 115 may perform authentication procedures using an alternative identity (i.e., a PMSI) instead of an IMSI to protect the privacy of the user. If the UE 115 does not have a PMSI, it may include a request for a PMSI initialization in an attach request. In some cases, PMSI initialization occurs once when a USIM of a UE 115 supports PMSI. In some examples, the PMSI may be used once, and a new PMSI may be generated for the next attachment procedure. In some cases, a USIM of the UE may not support storage of a PMSI. In this case, a privacy module of the UE 115 may communicate with the USIM according to the USIM's capabilities, and maintain a PMSI separately for communication with the network.

Figure 2:
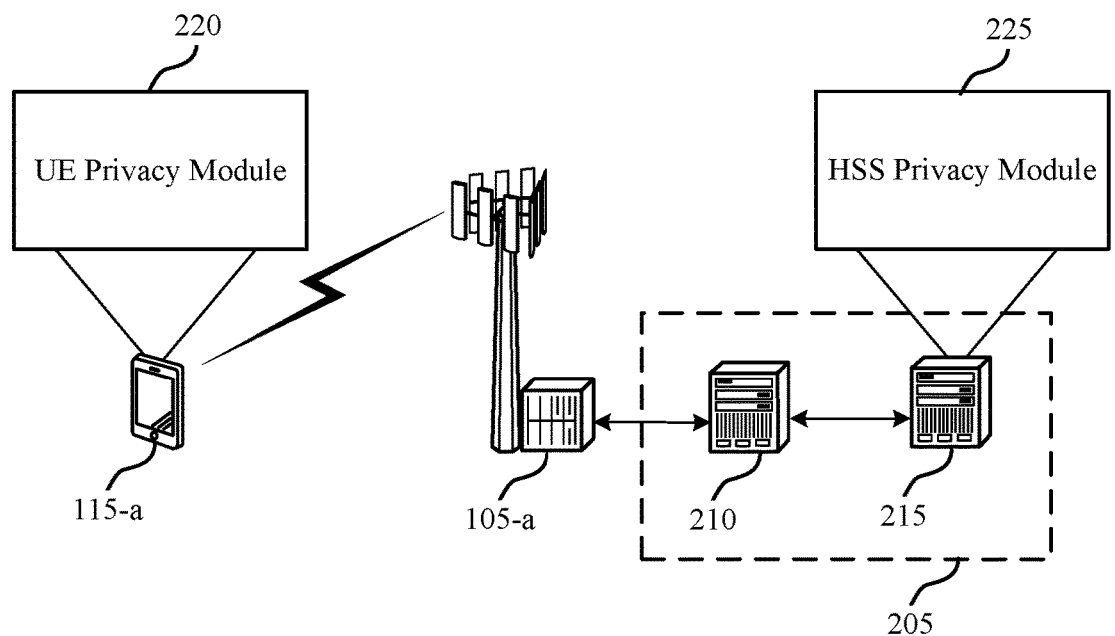

FIG. 2 illustrates an example of a wireless communications system 200 that supports authentication with a privacy identity. Wireless communications system 200 may include a UE 115-a and a base station 105-a that may be examples of the UEs 115 and base stations 105 described with reference to FIG. 1. Wireless communications system 200 may also include a core network 205, which may include network entities including MME 210 and HSS 215. Wireless communications system 200 may support authentication using a PMSI, as well as initialization of the PMSI when one is not stored within a USIM.

UE 115-a may use a PMSI when requesting an attach to a core network 205. A UE privacy module 220 may be implemented in UE 115. For example, if UE 115-a has a non-compatible USIM, UE 115-a may perform PMSI initialization and communicate with the network using a PMSI generated and stored in the UE privacy module 220. UE 115-a may thus trigger a PMSI initialization procedure; an example PMSI initialization procedure is described with reference to FIG. 4. In one aspect, PMSI initialization may be used to generate a PMSI generation key ($K_{PMSI}$) at UE 115-a. After installing the PMSI generation key, UE 115-a may use PMSI for subsequent requests to the network. In one aspect, a next PMSI may be determined based on a current PMSI. In some examples, PMSI may provide enhanced user identity protection from passive eavesdroppers or serving networks.

In one example of an initial serving network attachment using a PMSI, a current PMSI registered to HSS 215 may be used for an initial attach to the core network 205. The next PMSI (i.e., $PMSI_{next}$) may be sent to UE 115-a during an authentication and key agreement (AKA). Example of encryption key derivation are described in further detail herein with reference to FIG. 4. As discussed below, the next PMSI may be encrypted with an anonymity key (i.e., AK2). AK2 may be derived from a new PMSI generation key (i.e., $K_{PMSI}$) and a random number (RAND) as shown below in Equation 1. AK2 derivation may use a new key derivation function, hereafter referred to as F5'. An index may be used for accounting and to avoid PMSI collision. Then, the PMSI may be acknowledged by UE 115-a. UE 115-a may create an acknowledgement token (ACKTN) as shown in Equations 2 and/or 3 and send it to the HSS 215. In one aspect, the HSS 215 may update the current PMSI with the next PMSI, as shown in Equation 4, for example, once the ACKTN is acknowledged as shown in Equation 5, for example. In some cases, the IMSI may be retrieved after authentication by an authorized entity in the serving network.

The HSS 215 and UE 115-a may use a PMSI during subscriber registration to protect the privacy of the IMSI. That is, two identities, e.g., an IMSI and a PMSI, may be provisioned to a USIM and registered to the HSS 215. The PMSI may be used once per attach request, and a new PMSI may be determined if UE 115-a requests another attach. A PMSI may offer greater privacy compared to an IMSI because the IMSI may be permanently associated with a USIM of UE 115-a.

Figure 3:
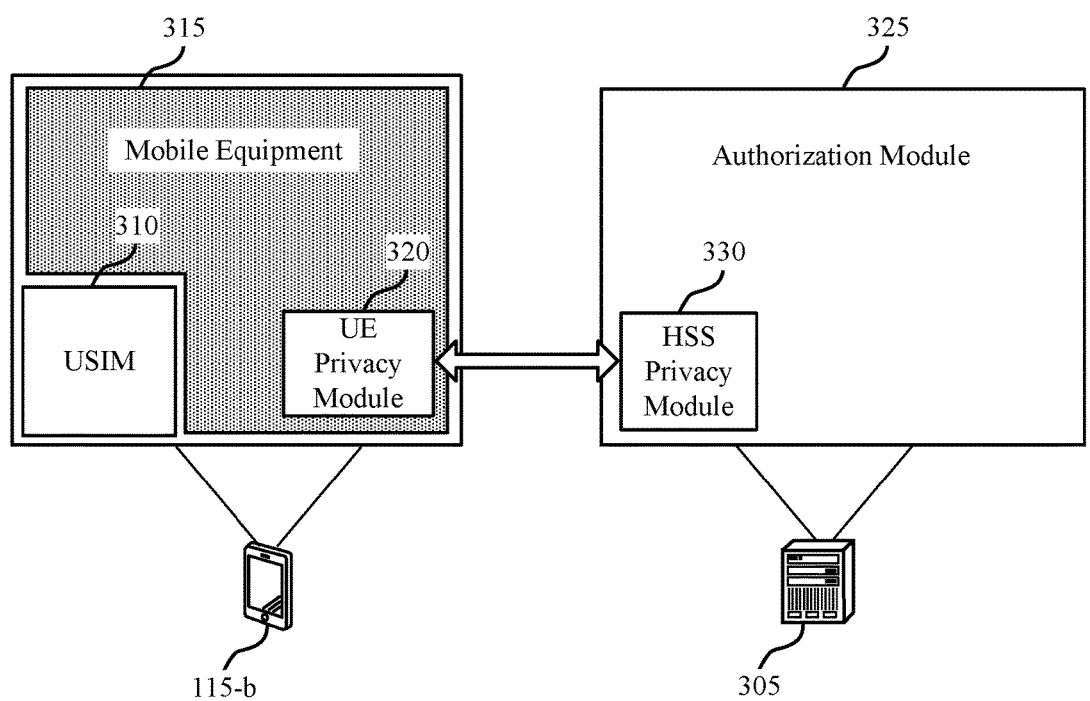
FIG. 3 illustrates an example of a wireless communications system 300 in which a UE 115 and a network entity communicate via privacy modules in accordance with aspects of the present disclosure.

FIG. 3 illustrates an example of wireless communications system 300 in which a UE 115 and a network entity communicate via privacy modules. The wireless communications system 300 may include UE 115-b, which may be an example of a UE 115 described with reference to FIG. 1. UE 115-b may exchange a PMSI with a home subscriber server (HSS) 305 as part of attach request. UE 115-b may include universal subscriber identity module (USIM) 315 and mobile equipment (ME) 320.

UE 115-b may request an attach using one or more mobile subscriber identities (e.g., an IMSI or a PMSI). HSS 305 may determine whether to approve the attach request based on a requesting user's authorization (e.g., the user's subscriber identity). The subscriber identity may be a permanent IMSI or a PMSI to protect the security of the IMSI.

USIM 310 may or may not be capable of storing PMSI and associated authorization information. If USIM 310 is not capable of using PMSI, UE privacy module 320 may generate and store the PMSI and related information. Also, if USIM 310 is not capable of, or is not currently storing, a PMSI, UE 115-b may perform a PMSI initialization procedure upon attaching to the network.

ME 315 may represent components of UE 115-b used for mobile communications, excluding USIM 310. ME 315 may include UE privacy module 320. The UE privacy module 320 may be capable of PMSI authorization and initialization procedures. For example, the UE privacy module 320 may identify or use different encryption keys (e.g., $K_{PMSI}'$ or $K_{ASME}'$ as described herein) associated with initialization and identify current or previous PMSI.

The HSS 305 may include an authorization module 325. The authorization module 325 may include an HSS privacy module 330. The HSS privacy module 330 may be capable of processing multiple different authentications for attach requests based on multiple different identities, for example a PMSI or an IMSI. The HSS privacy module 330 may generate encryption keys based on the PMSI received during the attach request. For example, the HSS privacy module may generate a $K_{PMSI}'$ or a $K_{ASME}'$. The HSS privacy module 330 may also be capable of generating a next PMSI based on a current PMSI. The HSS privacy module may encrypt subscriber identities with the encryption keys. The HSS privacy module 330 may communicate with a UE privacy module 320 to receive and send encryption keys for the attach request.

Figure 4:
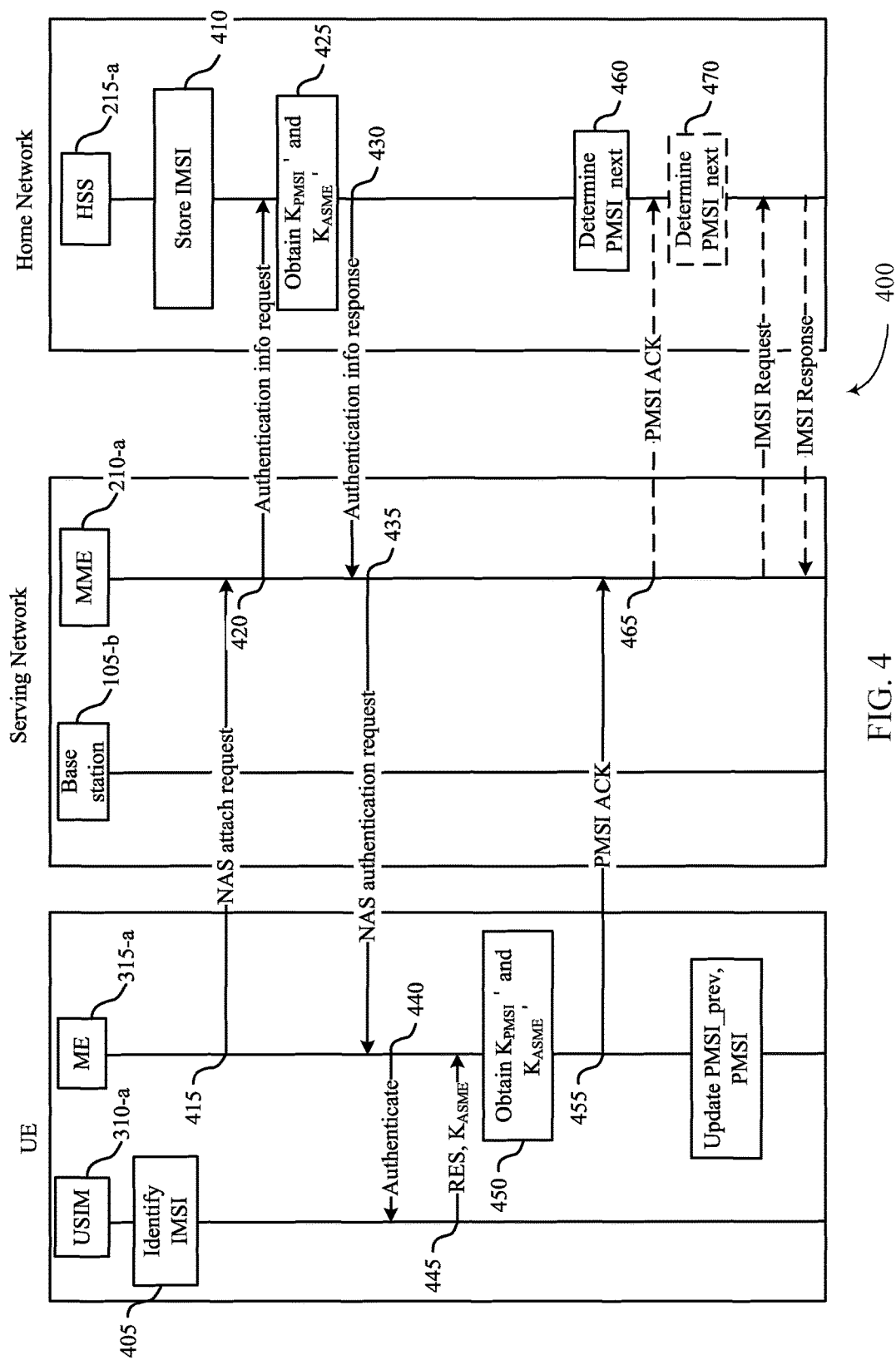
FIG. 4 illustrates an example of a process flow that supports authentication with a privacy identity in accordance with aspects of the present disclosure.

FIG. 4 illustrates an example of a process flow 400 for authentication with a privacy identity. Process flow 400 may include processes performed by USIM 310-a, ME 315-a, base station 105-b, MME 210-a, and a HSS 215-a. USIM 310-a and ME 315-a may be components of UE 115 described with reference to FIGS. 1-3. Base station 105-b and MME 210-a may be components of a serving network. HSS 215-a may be a component of a home network. Process flow 400 may be an example of a PMSI initialization procedure for circumstances in which USIM 310-a is not storing a current PMSI. Each of the devices described herein may exchange attachment messages (e.g., authentication requests and attach requests) and authentication information (e.g., encryption keys and subscriber identities) when a UE 115, requests access to a network. The UE 115 may communicate with the network via base station 105-b. For example, the UE 115 may transmit to base station 105-b, and base station 105-b may send the transmission to MME 210-a. In some aspects, MME 210-a then forwards authentication messages to HSS 215-a.

At 405, the UE 115 may identify an IMSI, which the UE 115 may use for an attach request to a home network. The IMSI may be stored at a USIM 310-a. At 410, HSS 215-a may also store the IMSI, which may be obtained from the UE 115 and may represent the identity of the UE 115 (or, more specifically, the identity stored in USIM 310-a). In cases where the UE 115 has previously initialized a PMSI, HSS 215-a may identify an additional mobile subscriber identity; for example HSS 215-a may store a PMSI or a previous PMSI.

At 415, the UE 115 may send an attach request to MME 210-a, which may be part of a serving network. The attach request may include the IMSI and an initialization request for an additional mobile subscriber identity.

At 420, MME 210-a may transmit an authentication information request to HSS 215-a of a home network. The authentication information request may include the IMSI and/or a serving network identification, as well as the initialization request for an additional mobile subscriber identity (e.g., the PMSI). In some examples, the authentication information request may include the IMSI because the authentication information request may be transmitted before PMSI initialization.

At 425, HSS 215-a may determine authentication keys. For example, HSS 215-a may obtain $K_{PMSI}'$ based on a $K_{ASME}$ and a first function, such as Equation 6 shown below and $K_{ASME}'$ based on the $K_{ASME}$ and a second function, such as Equation 7 shown below. That is, HSS 215-a may obtain a master session key. In one example, HSS 215-a may obtain an additional master session key and an additional mobile subscriber key based on the master session key (e.g., $K_{ASME}'$ in addition to $K_{ASME}$ and $K_{PMSI}'$ in addition to $K_{PMSI}$).

When UE 115 identifies a USIM without a PMSI, UE 115 may perform a PMSI initialization procedure. UE 115 may perform the PMSI initialization procedure by sending a PMSI initialization indication to the core network 205 (e.g., the serving network) or an entity therein during the attach (e.g., using IMSI). The serving network (e.g., MME 210-a) may transmit an authentication information request along with the PMSI initialization indication to the HSS 215-a. Upon receiving an authentication information request with the PMSI initialization indication from the serving network, the HSS 215-a may prepare authentication vector (AV), and may derive two keys ($K_{PMSI}'$ and $K_{ASME}'$) from session key $K_{ASME}$. For example, one key, $K_{PMSI}'$ may be derived based on Equation 8:

$$K_{PMSI}'=F1(K_{ASME})=KDF(K_{ASME}, \text{``PMSI generation key derivation"}). \quad (9)$$

An alternative session key may be derived based on Equation 10:

$$K_{ASME}'=F2(K_{ASME})=KDF(K_{ASME}, \text{``KASME derivation for PMSI initialization"}), \quad (11)$$

where KDF may be a key derivation function, such as HMAC-SHA-256. In some examples, $K_{AMSE}'$ may be set to $K_{ASME}$ in the authentication vector (e.g., used for deriving NAS keys and AS keys by MME 210-a and UE 115).

$K_{PMSI}'$ may be used as an updated version of $K_{PMSI}$ or for the encryption of a current $K_{PMSI}$. The next PMSI (i.e., $PMSI_{Next}$) and, in some cases, the encrypted $K_{PMSI}$ may be sent to UE 115 during an authentication and key agreement (AKA). The next PMSI may be encrypted with an anonymity key (i.e., AK2), where AK2 may be derived from $K_{PMSI}$ (the PMSI generation key) and a random number (RAND). In some cases, AK2 derivation may use a new key derivation function, f5', as shown below in Equation 12. In some one aspect, when KEK is used (e.g., $K_{PMSI}$ is encrypted using $K_{PMSI}'$), the encrypted $K_{PMSI}$ may also be authenticated based on a message authentication code (or MAC) generated using $K_{PMSI}'$ or another key derived from $K_{PMSI}'$. In another aspect, the PMSI generation key ($K_{PMSI}$), $PMSI_{Next}$, and an index associated with the $PMSI_{Next}$ may be encrypted and authenticated using $K_{PMSI}'$.

UE 115 may also obtain one or more encryption keys associated with the initialization. To obtain the one or more encryption keys, the UE 115 may obtain $K_{PMSI}'$ and $K_{ASME}'$ from the $K_{ASME}$ as described above (i.e., in a similar manner as they are derived within the HSS 215-a from the shared key, K).

In some examples, PMSI may be implemented at the UE 115-a with a legacy USIM. In such a case, the UE 115-a may obtain $K_{PMSI}'$ and $K_{ASME}'$ from the $K_{ASME}$ as described above in Equations 13 and 14, respectively. UE 115-a may also use $K_{PMSI}'$ as a new $K_{PMSI}$ or for decryption of the current $K_{PMSI}$. Also, the UE may use $K_{ASME}'$ in place of $K_{ASME}$ as is done by HSS 215-a. In some cases, UE 115-a may verify the message authentication code using $K_{PMSI}'$. PMSI may be acknowledged by UE 115-a by creating an ACK token (ACKTN) and send the ACKTN to the HSS 215-a. The HSS 215-a may then update the current PMSI with the next PMSI (i.e., $PMSI_{Next}$).

In some examples, HSS 215-a may then encrypt the additional mobile subscriber identity (e.g., the PMSI) based on the additional mobile subscriber identity key ($K_{PMSI}'$). In another example, HSS 215-a may obtain the additional master session key, the mobile subscriber identity key and the additional mobile subscriber identity key based on the master session key. HSS 215-a may then encrypt the mobile subscriber identity key ($K_{PMSI}$) based on the additional mobile subscriber identity key ($K_{PMSI}'$), and HSS 215-a may encrypt the additional mobile subscriber identity (PMSI or $PMSI_{Next}$) based on the mobile subscriber identity key ($K_{PMSI}$).

In one aspect, UE 115-a and the HSS 215-a may use over-the-air PMSI registration. In one example of over-the-air PMSI registration, UE 115-a may provide a first PMSI by encrypting PMSI with an HSS public key. In another example of over-the-air PMSI registration, the HSS 215-a may provide the first PMSI by encrypting PMSI using a UE provisioning key.

UE 115-a may use a PMSI for an initial attach request. PMSI may be used as a UE identity (e.g., instead of IMSI) in some serving networks. In one aspect, each PMSI may only be used once. That is, in some examples, attaches involving the HSS 215-a may use a new PMSI. In another aspect, PMSIs may be derived by UE 115-a and the HSS 215-a, and other entities may be unable to identify a correlation between PMSIs.

In one aspect, PMSI may be derived, by the HSS 215-a and UE 115-a, based on a shared secret key K and a sequence number (SQN). PMSI synchronization may be handled by PMSI construction, and a current PMSI may be changed after use. That is, the next PMSI may be derived from the current PMSI.

For example, the next PMSI may be derived based on a mobile country code (MCC), a mobile network code (MNC), a $K_{PMSI}$, and a current PMSI (i.e., the PMSI which directly precedes the next PMSI). The next PMSI may be based on Equation 15:

$$PMSI_{Next} = MCC|MNC|\text{Truncate}(HMAC(K_{PMSI}, PMSI)), \quad (16)$$

where $K_{PMSI}$ may be derived based on Equation 17:

$$K_{PMSI} = KDF(K, CTX), \quad (18)$$

where KDF is a key derivation function, K is a root key, and CTX is a PMSI derivation key context. Alternatively, $K_{PMSI}$ may be provisioned at the UE independently of the shared secret key K, or initialized by HSS 215-a as described herein.

As another example, $PMSI_{Next}$ may be chosen by the HSS 215-a. In this case, the encrypted PMSI may be authenticated using a message authentication code (MAC).

In some aspects, a function may be used to truncate an output such that $PMSI_{Next}$ is a certain length, for example, 15 digits long. In some examples, a PMSI may contain fewer or more digits. To assist PMSI derivation, the PMSI may be stored with an index. The index may enable the PMSI to be computed from an initial (or previous) PMSI. For example, the PMSI may be derived by repeatedly hashing the initial PMSI. The index may also be used to resolve potential collisions and confusion regarding which PMSI is in use. For example, if the HSS 215-a identifies a collision when generating $PMSI_{Next}$, the HSS 215-a may increase the index and get a new $PMSI_{Next}$. The HSS 215-a and UE 115 may derive previous PMSIs by hashing the initial PMSI, which may enable the HSS 215-a to manage PMSIs associated with an IMSI or a UE 115 more efficiently for accounting and charging purposes.

PMSIs may be protected with encryption keys. Example equations for deriving such encryption keys are described below. Other types of encryption or key derivation may be employed. By way of example, a PMSI encryption key AK2 may be derived based on Equation 19:

$$AK2 = f5'(K_{PMSI}, RAND), \quad (20)$$

where f5' is a key derivation function and RAND is a random number used for AUTN generation (i.e., AK generation). Alternatively, RAND may be another randomly chosen number by the HSS 215-a. In such a case, RAND may be sent to the UE 115 separately from the RAND in the authentication vector during the authentication. In some examples, key encrypting key (KEK) may be used for AK2 if, for example, the initial serving network authentication is enabled.

An acknowledgement token (ACKTN) for the encryption may be determined based on Equation 21:

$$ACKTN = Enc_{ACK3}(SQN_{MS})||MAC-A, \quad (22)$$

and may be used for synchronization purposes. AK3, as used in Equation 6, may in turn be determined based on Equation 23:

$$AK3 = f5''(K_{PMSI}, RAND2||\text{"ACK encryption key"}), \quad (24)$$

where f5'' is a key derivation function.
Additionally, MAC-A, as used in Equation 25, may be determined based on Equation 26:

$$MAC-A = f1'(AK4, SQN_{MS}|RAND'|AMF), \quad (27)$$

where f1' is a message authentication function and AMF is an authentication management field. And, AK4, as used in Equation 28 may be determined based on Equation 29:

$$AK4 = f5'''(K_{PMSI}, RAND2||\text{"ACK encryption key"}), \quad (30)$$

where f5''' is a key derivation function.

As an alternative, an ACKTN may be determined based on Equation 31:

$$ACKTN = MAC-A, \quad (32)$$

and, MAC-A may be determined based on Equation 33:

$$MAC-A = f1'(AK4, PMSI_{next}||\text{Index}), \quad (34)$$

where f1' is a message authentication function. In such examples, AK4, as used in Equation 35, may be determined based on Equation 36:

$$AK4 = f5'''(K_{PMSI}, \text{"ACK authentication key"}), \quad (37)$$

where f5''' is a key derivation function.

If ACKTN is generated in this manner, the PMSI used for the attach request may be sent to the HSS 215-a instead for RAND2 in the acknowledgement message. The PMSI may be included in the PMSI acknowledgement by UE 115 or by the MME 210-a in the serving network as described herein.

At 430, HSS 215-a may send an authentication information response in response to the attach request. In some cases, the authentication information response may include the encrypted additional mobile subscriber identity (PMSI) and the additional master session key ($K_{ASME}'$). In another example, the authentication information response may also include the encrypted mobile subscriber identity key ($K_{PMSI}$).

At 435, MME 210-a may send an authentication request to the UE 115. In some examples, the authentication request may include the additional mobile subscriber identity, such as a PMSI, which may be encrypted. The authentication request may also include the mobile subscriber identity key ($K_{PMSI}$), which may be encrypted.

As discussed above, in some examples, an additional PMSI generation key ($K_{PMSI}'$) may be used to encrypt the PMSI generation key ($K_{PMSI}$), which may be sent to UE 115 in the authentication request along with the encrypted PMSI. The encrypted $K_{PMSI}$ and a next PMSI (i.e., $PMSI_{Next}$) may be sent to UE 115. $K_{PMSI}$ may be encrypted with $K_{PMSI}'$ and $PMSI_{Next}$ may be encrypted with an anonymity key (i.e., AK2) derived from $K_{PMSI}$ (i.e., a PMSI generation key) and a random number. In some cases, the additional PMSI generation key ($K_{PMSI}'$) may be used to encrypt the PMSI generation key ($K_{PMSI}$), $PMSI_{Next}$, and an index associated with the $PMSI_{Next}$. The index may be an initial index.

At 440 through 450, the UE 115 may identify one or more encryption keys for initialization based at least in part on receiving the authentication request in 435. In some cases, identifying an encryption key may include obtaining and decrypting the encryption key. Each of 440 through 450 are described in more detail below.

In some aspects, the encrypted $K_{PMSI}$ may be authenticated using $K_{PMSI}'$ or another key derived from $K_{PMSI}'$. (e.g., a message authentication code or MAC of the encrypted $K_{PMSI}$ is generated based on $K_{PMSI}'$). UE 115 may then obtain $K_{PMSI}'$ from $K_{ASME}$. In some cases, PMSI may be implemented at the UE 115 with a legacy USIM. In such a case, the UE 115 may obtain $K_{PMSI}'$ and $K_{ASME}'$ from the $K_{ASME}$ as described above. UE 115 may then decrypt $K_{PMSI}$ using $K_{PMSI}'$, and decrypt $PMSI_{Next}$ using $PMSI_{Next}$. In some cases, UE 115 may verify the message authentication code using $K_{PMSI}'$.

At 440, the UE 115 may authenticate the received keys at USIM 310-a. For example, the ME 315-a may send an authentication and a random number to USIM 310-a based on the authentication request. In some cases, a privacy module may serve as an intermediary if USIM 310-a does not support the use of PMSI, such that the authentication information provided to (and received from) USIM 310-a corresponds to the capabilities of a USIM that supports PMSI.

At 445, the UE 115 may respond to the authentication request and obtain the response and a new master session key (e.g., $K_{ASME}$) at ME 315-a.

At 450, the UE 115 may obtain encryption keys. The UE 115, for example at ME 315-a, may obtain $K_{PMSI}'$, for example based on a $K_{ASME}$ and a first function, and $K_{ASME}$, for example based on the $K_{ASME}$ and a second function. In another example, the UE 115 may further identify $K_{PMSI}$ based on decoding a $K_{PMSI}$ encoded by $K_{PMSI}'$. The UE 115 may obtain a master session key, then obtain an additional master session key and an additional mobile subscriber identity key based on the master session key. Then, the UE 115 may decrypt the additional mobile subscriber identity (e.g., PMSI) based on the additional mobile subscriber identity key. In some cases, the UE may decrypt the additional mobile subscriber identity (PMSI), $K_{PMSI}$, $PMSI_{Next}$, an index associated with the $PMSI_{Next}$, or any combination thereof.

In some examples, at 455 the UE 115 may send a PMSI acknowledgement to MME 210-a. In one aspect, the PMSI acknowledgement may include an ACK token and a second random number. The acknowledgement may be based on decrypting the additional mobile subscriber identity. In another aspect, the PMSI acknowledgement may include the ACK token but not include a random number. In yet another aspect, the PMSI acknowledgement may include an ACK token and the PMSI that is used for the authentication request (i.e., at 415).

At 460 or at 470, HSS 215-a may obtain a next PMSI. In other words, 460 and 470 may be employed in the alternative such that the next PMSI may be determined before or after HSS 215-a receives a PMSI acknowledgement. The next PMSI may be based on the current PMSI. The current PMSI may then be set to the previous PMSI. In some cases, the additional mobile subscriber identity (e.g., the current PMSI) may be associated with a first index, and a subsequent version of the additional mobile subscriber identity (e.g., the next PMSI) may be associated with a second index.

At 465, MME 210-a may send the PMSI acknowledgement to HSS 215-a. HSS 215-a may obtain a next PMSI at 460 before receiving the PMSI acknowledgment or at 470 after receiving the PMSI acknowledgment. That is, in some examples HSS 215-a can obtain the next PMSI immediately after 425. However, the next PMSI obtained at 460 may be in an unacknowledged state (i.e., not confirmed by UE); whereas at 470 the PMSI may be in an acknowledged state. If HSS 215-a has not received an acknowledgement from the UE 115, HSS 215-a may expect the previous PMSI to be used for the next UE attach procedure (i.e., in the scenario that 430, 435, or 440 is lost and the UE 115). If HSS 215-a received an acknowledgement from the UE 115, the HSS 215-a may expect the next PMSI for the subsequent attach (i.e., if the previous PMSI is used, then HSS 215-a may reject the request).

In some examples, when the HSS 215-a receives an authentication information request with an unacknowledged next PMSI, the HSS 215-a may provide the UE 115 the same PMSI as a next PMSI to be used for the subsequent attach, instead of deriving a new PMSI based on the PMSI included in the authentication information request.

In some examples, MME 210-a (or another authorized entity in the serving network) may retrieve the IMSI from the HSS 215-a. To do so, the MME 210-a may send an IMSI request to HSS 215-a that includes the PMSI. HSS 215-a may respond with an IMSI response including the PMSI and an encrypted version of the IMSI. An IMSI request and response by a MME 210-a may be protected with an encryption key. An example encryption key is represented in Equation 38:

$$K_{IMSI} = HMAC(K_{AMSE}, IMSI\ \text{retrieval key}), \quad (39)$$

where an IMSI can be decrypted by the MME 210-a that owns the valid $K_{AMSE}$ for UE 115. HSS 215-a may send $PMSI_{prev}$ to further protect the identity of UE 115.

Figure 5:
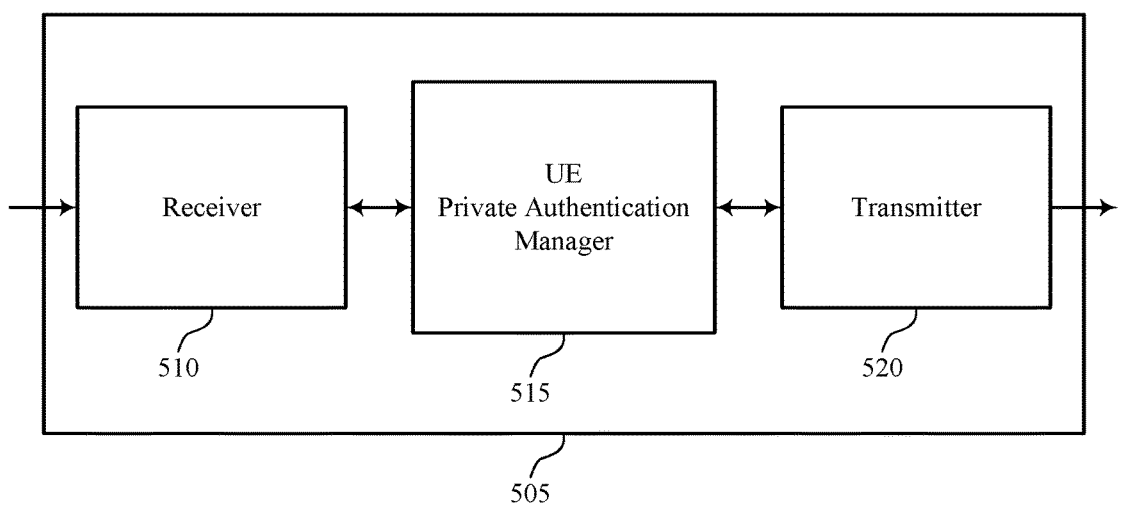
FIGS. 5 through 7 show block diagrams of a device that supports authentication with a privacy identity in accordance with aspects of the present disclosure.

FIG. 5 shows a block diagram 500 of a wireless device 505 that supports authentication with a privacy identity in accordance with various aspects of the present disclosure. Wireless device 505 may be an example of aspects of a UE 115 as described with reference to FIG. 1. Wireless device 505 may include receiver 510, UE private authentication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to authentication with a privacy identity, etc.). Information may be passed on to other components of the device. The receiver 510 may be an example of aspects of the transceiver 835 described with reference to FIG. 8.

UE private authentication manager 515 may be an example of aspects of the UE private authentication manager 815 described with reference to FIG. 8. UE private authentication manager 515 may, in combination with other components of device 505 (e.g., transmitter 520), transmit an attach request including an IMSI and an initialization request for an additional mobile subscriber identity. UE private authentication manager 515 may, in combination with other components of device 505 (e.g., receiver 510), receive an authentication request in response to the attach request based on the initialization request for the additional mobile subscriber identity, where the authentication request includes the additional mobile subscriber identity. UE private authentication manager 515 may, in combination with other components of device 505 (e.g., transmitter 520), also transmit an acknowledgement for the additional mobile subscriber identity in response to the authentication request.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
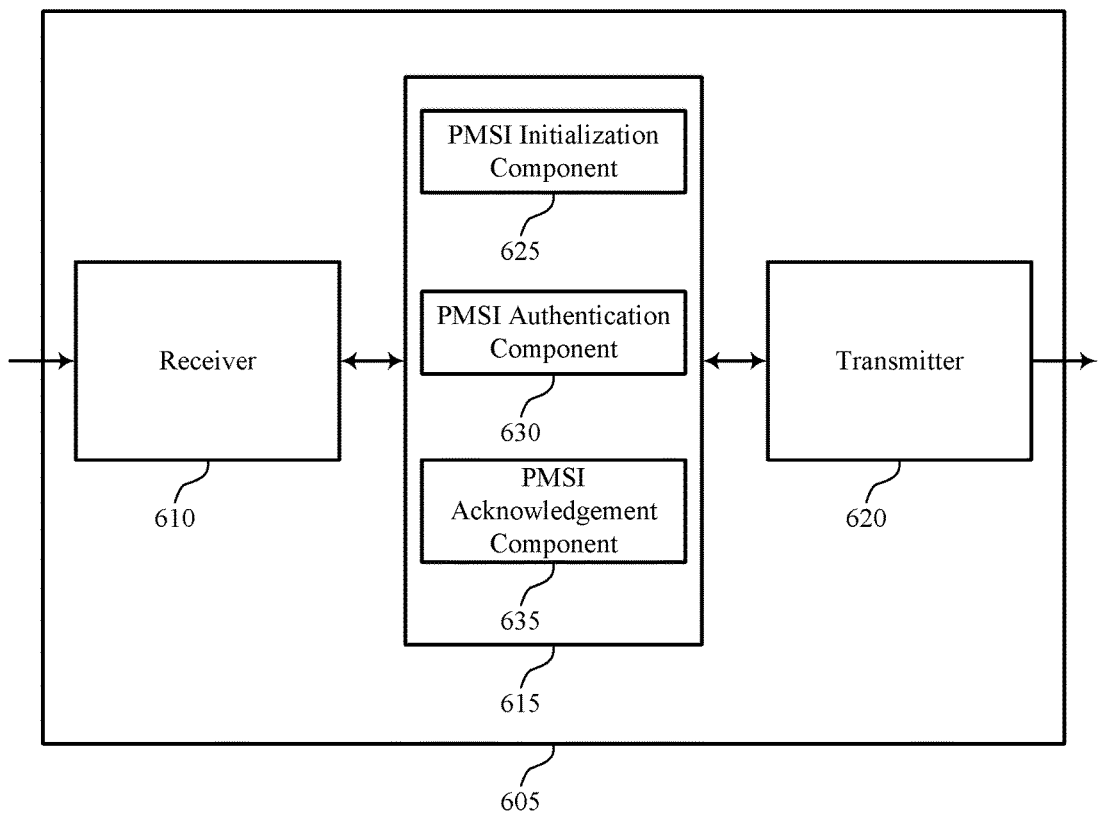

FIG. 6 shows a block diagram 600 of a wireless device 605 that supports authentication with a privacy identity in accordance with various aspects of the present disclosure. Wireless device 605 may be an example of aspects of a wireless device 505 or a UE 115 as described with reference to FIGS. 1 and 5. Wireless device 605 may include receiver 610, UE private authentication manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to authentication with a privacy identity, etc.). Information may be passed on to other components of the device. The receiver 610 may be an example of aspects of the transceiver 835 described with reference to FIG. 8.

UE private authentication manager 615 may be an example of aspects of the UE private authentication manager 815 described with reference to FIG. 8. UE private authentication manager 615 may also include PMSI initialization component 625, PMSI authentication component 630, and PMSI acknowledgement component 635.

PMSI initialization component 625 may, in combination with transmitter 620, for example, transmit an attach request including an IMSI and an initialization request for an additional mobile subscriber identity. In some cases, the additional mobile subscriber identity is a PMSI.

PMSI authentication component 630 may, in combination with receiver 610, for example, receive an authentication request in response to the attach request based on the initialization request for the additional mobile subscriber identity, where the authentication request includes the additional mobile subscriber identity. PMSI authentication component 630 may also identify one or more encryption keys for initialization based at least in part on receiving the authentication request. In some cases, the encryption keys of the authentication request include a mobile subscriber identity key. In some cases, the authentication request includes an encrypted version of the additional mobile subscriber identity. PMSI acknowledgement component 635 may transmit an acknowledgement for the additional mobile subscriber identity in response to the authentication request.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
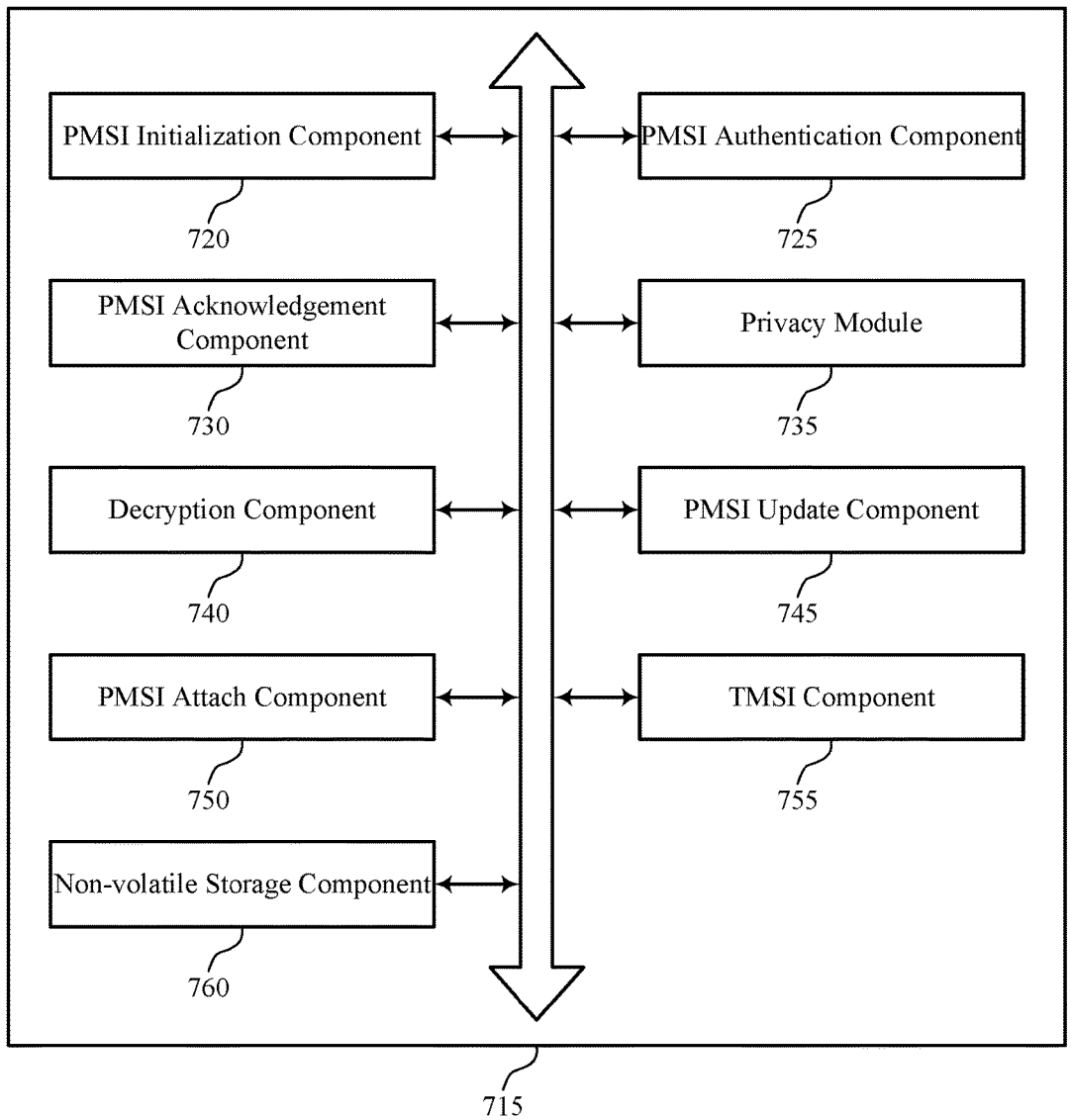

FIG. 7 shows a block diagram 700 of a UE private authentication manager 715 that supports authentication with a privacy identity in accordance with various aspects of the present disclosure. The UE private authentication manager 715 may be an example of aspects of a UE private authentication manager 515, a UE private authentication manager 615, or a UE private authentication manager 815 described with reference to FIGS. 5, 6, and 8. The UE private authentication manager 715 may include PMSI initialization component 720, PMSI authentication component 725, PMSI acknowledgement component 730, privacy module 735, decryption component 740, PMSI update component 745, PMSI attach component 750, TMSI component 755, and non-volatile storage component 760. Each of these modules may communicate, directly or indirectly, with one another (e.g., via one or more buses), and the modules may perform the various functions described herein with other components or modules, including transmitters and receivers.

PMSI initialization component 720 may transmit an attach request including an IMSI and an initialization request for an additional mobile subscriber identity. In some cases, the additional mobile subscriber identity is a PMSI.

PMSI authentication component 725 may receive an authentication request in response to the attach request based on the initialization request for the additional mobile subscriber identity, where the authentication request includes the additional mobile subscriber identity. PMSI acknowledgement component 730 may transmit an acknowledgement for the additional mobile subscriber identity in response to the authentication request.

Privacy module 735 may identify an absence of the additional mobile subscriber identity in a universal subscriber identity module (USIM), where the attach request is transmitted based on the absence of the additional mobile subscriber identity. In some cases, the USIM does not support the additional mobile subscriber identity. In some cases, the USIM is configured for operation according to at least one of UMTS, LTE, or LTE-Advanced (LTE-A). In some cases, the USIM is configured for operation according to a next generation mobile network, which may operate according to a different RAT (e.g., a 5G or new radio (NR) RAT) other than UMTS, LTE, or LTE-A. In some cases, the master session key is obtained based on a shared root key of a UE and a network entity.

Decryption component 740 may obtain a master session key and obtain an additional master session key and an additional mobile subscriber identity key based on the master session key. In one aspect, decryption component 740 may decrypt the additional mobile subscriber identity based on the additional mobile subscriber identity key, where the acknowledgement is based on decrypting the additional mobile subscriber identity. In one aspect, decryption component 740 may decrypt the mobile subscriber identity key based on the additional mobile subscriber identity key. In one aspect, decryption component 740 may decrypt the additional mobile subscriber identity based on the mobile subscriber identity key, where the acknowledgement is based on decrypting the additional mobile subscriber identity. In some cases, the authentication request includes an encrypted version of the mobile subscriber identity key.

PMSI update component 745 may obtain a subsequent version of the additional mobile subscriber identity, where the additional mobile subscriber identity is associated with a first index and the subsequent version of the additional mobile subscriber identity is associated with a second index. In some cases, the subsequent version of the additional mobile subscriber identity is derived from the additional mobile subscriber identity. In some cases, the additional mobile subscriber identity is a single use identity.

PMSI attach component 750 may transmit a subsequent attach request including the additional mobile subscriber identity. TMSI component 755 may receive an indication of a temporary mobile subscriber identity (TMSI). Non-volatile storage component 760 may store the additional mobile subscriber identity in a non-volatile memory.

Figure 8:
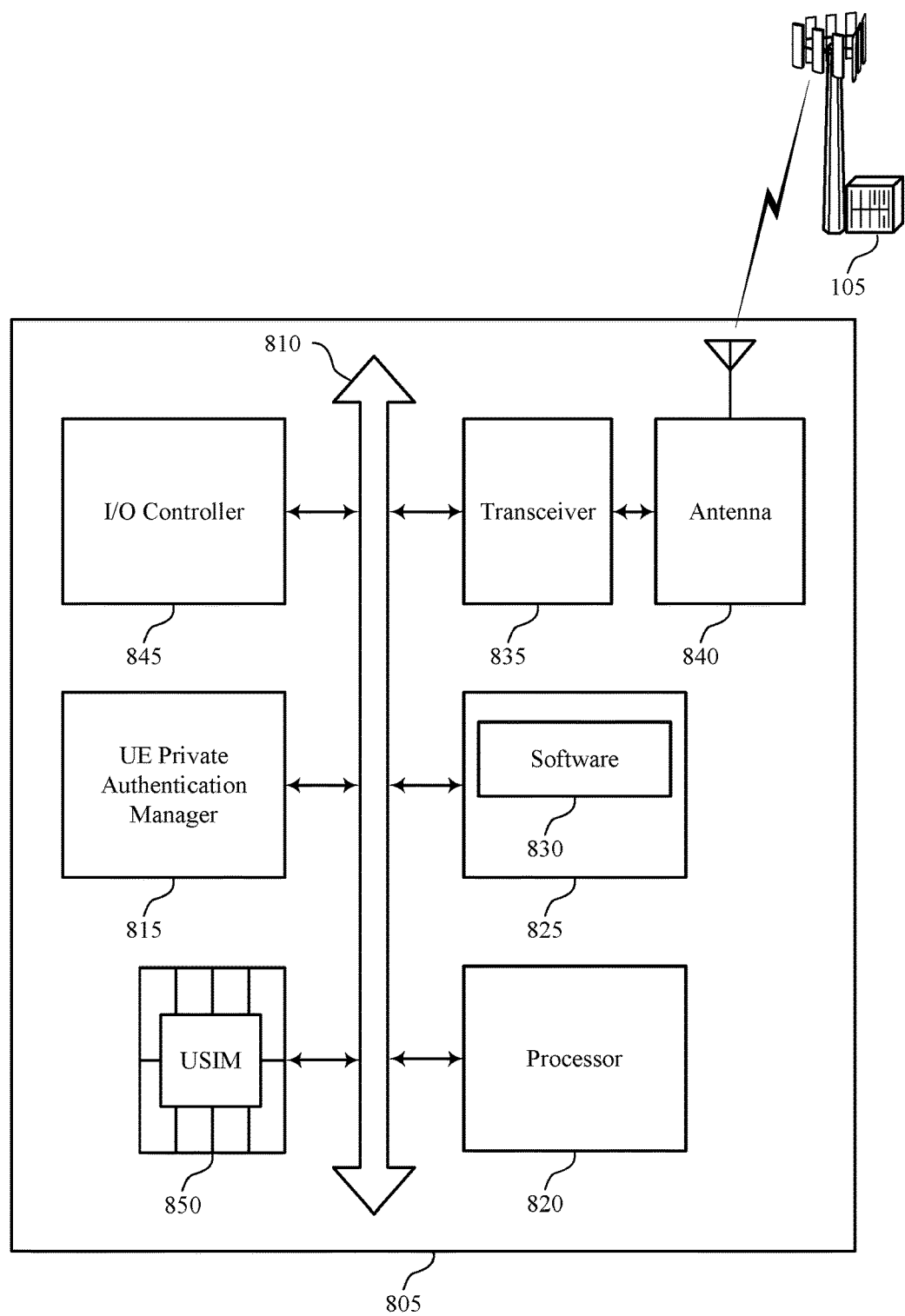
FIG. 8 illustrates a block diagram of a system including a UE that supports authentication with a privacy identity in accordance with aspects of the present disclosure.

FIG. 8 shows a diagram of a system 800 including a device 805 that supports authentication with a privacy identity in accordance with various aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE private authentication manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting authentication with a privacy identity). 820.

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a Basic Input-Output system (BIOS) which may control basic hardware and/or software operation such as the interaction with peripheral components or devices.

Software 830 may include code to implement aspects of the present disclosure, including code to support authentication with a privacy identity. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
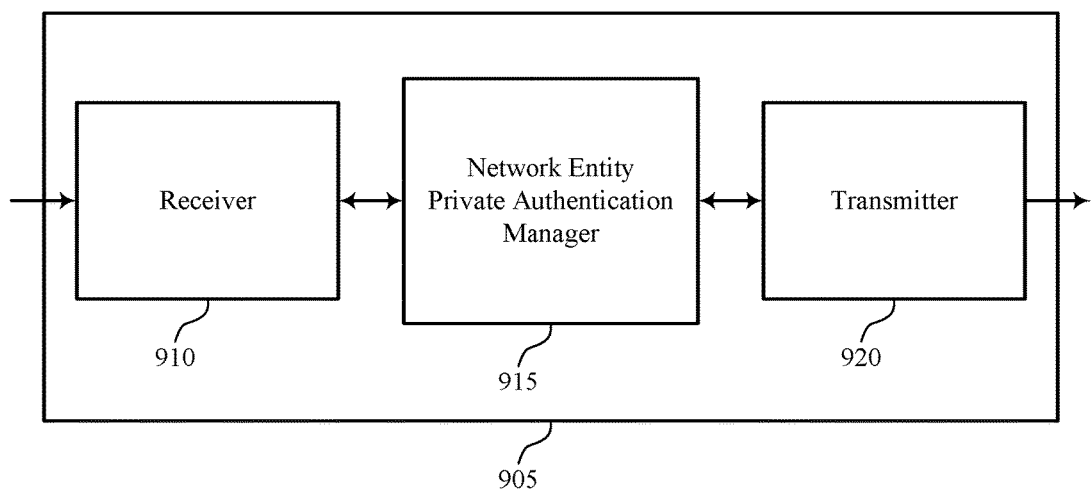
FIGS. 9 through 11 show block diagrams of a device that supports authentication with a privacy identity in accordance with aspects of the present disclosure.

FIG. 9 shows a block diagram 900 of a wireless device 905 that supports authentication with a privacy identity in accordance with various aspects of the present disclosure. Wireless device 905 may be an example of aspects of a network entity 130 as described with reference to FIG. 1. For example, wireless device 905 may represent an HSS. Wireless device 905 may include receiver 910, network entity private authentication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to authentication with a privacy identity, etc.). Information may be passed on to other components of the device. The receiver 910 may be an example of aspects of the transceiver 1235 described with reference to FIG. 12.

Network entity private authentication manager 915 may be an example of aspects of the network entity private authentication manager 1215 described with reference to FIG. 12. Network entity private authentication manager 915 may, in combination with receiver 910, for example, receive an authentication information request including an IMSI and an initialization request for an additional mobile subscriber identity. Network entity private authentication manager 915 may, in combination with transmitter 920, for example, transmit an authentication information response based on the initialization request for the additional mobile subscriber identity, where the authentication information response includes the additional mobile subscriber identity. Network entity private authentication manager 915 may, in combination with receiver 910, for example, may also receive an acknowledgement for the additional mobile subscriber identity based on the authentication information response.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
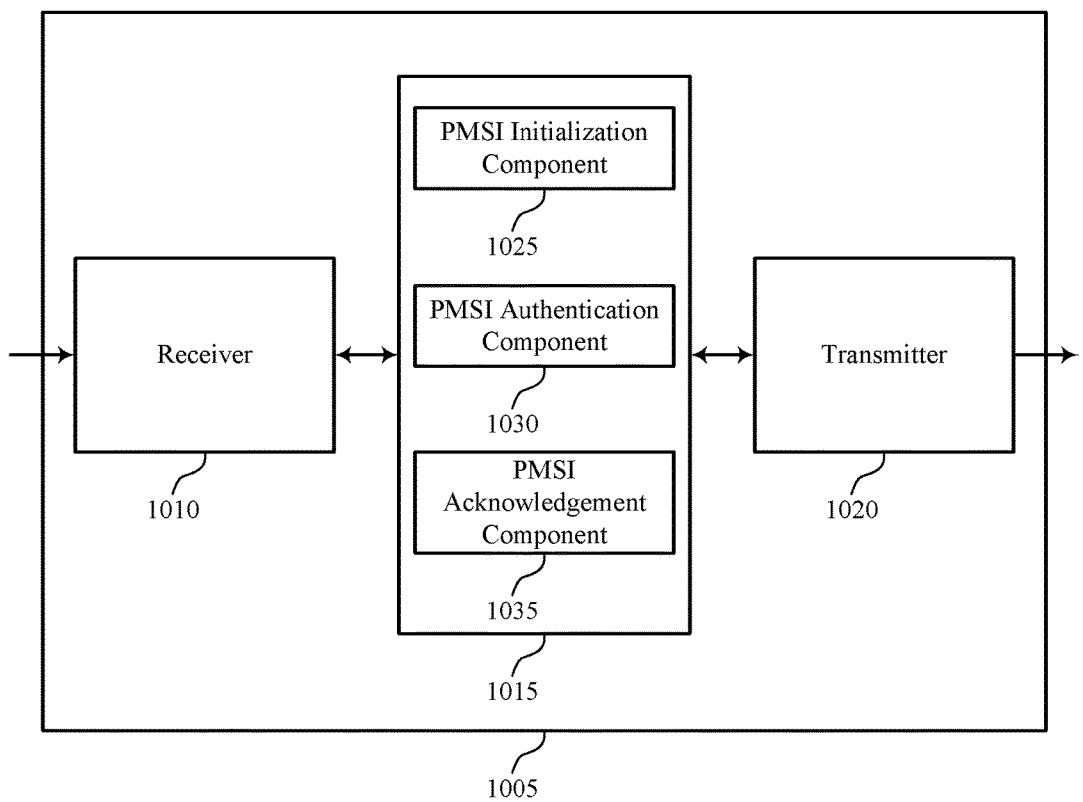

FIG. 10 shows a block diagram 1000 of a wireless device 1005 that supports authentication with a privacy identity in accordance with various aspects of the present disclosure. Wireless device 1005 may be an example of aspects of a wireless device 905 or a network entity 130 as described with reference to FIGS. 1 and 9. Wireless device 1005 may include receiver 1010, network entity private authentication manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to authentication with a privacy identity, etc.). Information may be passed on to other components of the device. The receiver 1010 may be an example of aspects of the transceiver 1235 described with reference to FIG. 12.

Network entity private authentication manager 1015 may be an example of aspects of the network entity private authentication manager 1215 described with reference to FIG. 12. Network entity private authentication manager 1015 may also include PMSI initialization component 1025, PMSI authentication component 1030, and PMSI acknowledgement component 1035.

PMSI initialization component 1025 may, in combination with receiver 1010, for example, receive an authentication information request including an IMSI and an initialization request for an additional mobile subscriber identity. In some cases, the additional mobile subscriber identity is a PMSI. PMSI authentication component 1030 may, in combination with transmitter 1020, for example, transmit an authentication information response based on the initialization request for the additional mobile subscriber identity, where the authentication information response includes the additional mobile subscriber identity. PMSI acknowledgement component 1035 may, in combination with receiver 1010, for example, receive an acknowledgement for the additional mobile subscriber identity based on the authentication information response.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
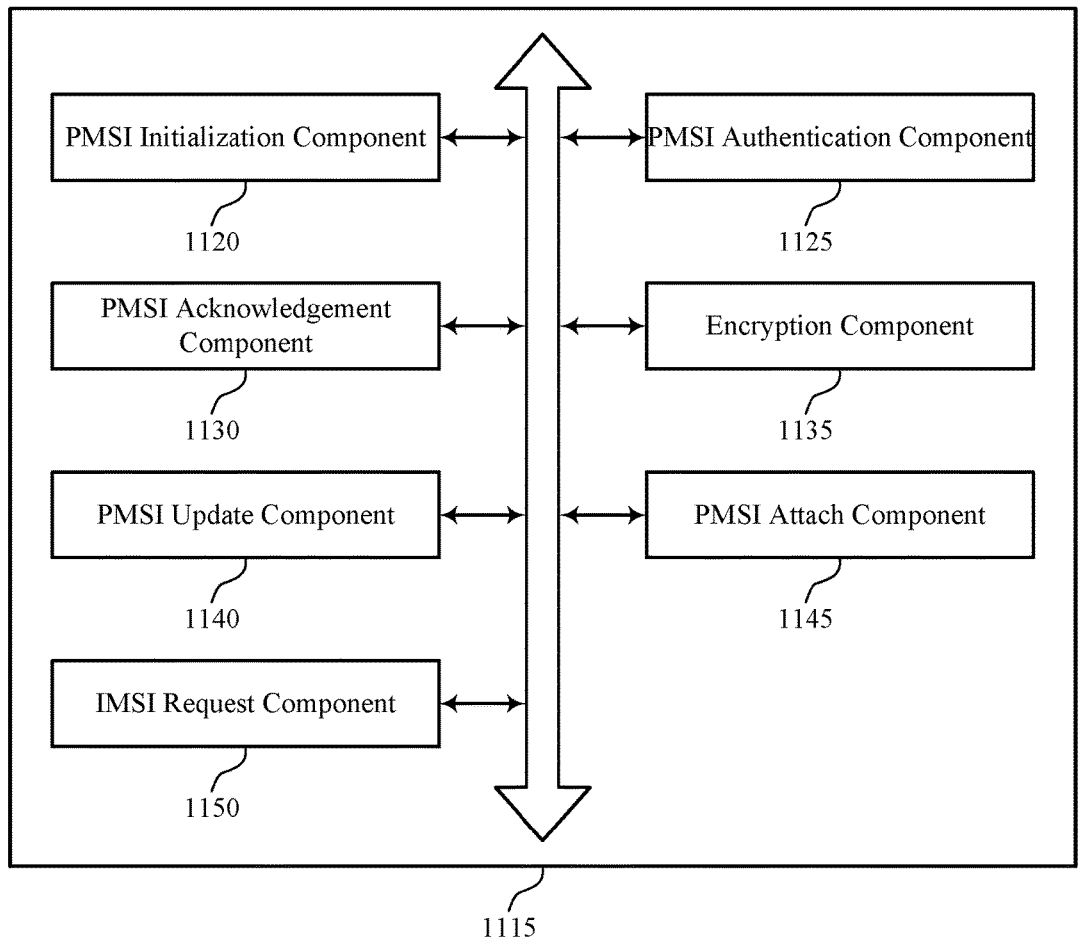

FIG. 11 shows a block diagram 1100 of a network entity private authentication manager 1115 that supports authentication with a privacy identity in accordance with various aspects of the present disclosure. The network entity private authentication manager 1115 may be an example of aspects of a network entity private authentication manager 1215 described with reference to FIGS. 9, 10, and 12. The network entity private authentication manager 1115 may include PMSI initialization component 1120, PMSI authentication component 1125, PMSI acknowledgement component 1130, encryption component 1135, PMSI update component 1140, PMSI attach component 1145, and IMSI request component 1150. Each of these modules may communicate, directly or indirectly, with one another (e.g., via one or more buses), and the modules may perform the various functions described herein with other components or modules, including transmitters and receivers.

PMSI initialization component 1120 may receive an authentication information request including an IMSI and an initialization request for an additional mobile subscriber identity. PMSI authentication component 1125 may transmit an authentication information response based on the initialization request for the additional mobile subscriber identity, where the authentication information response includes the additional mobile subscriber identity. PMSI acknowledgement component 1130 may receive an acknowledgement for the additional mobile subscriber identity based on the authentication information response.

Encryption component 1135 may obtain a master session key, an additional master session key, and an additional mobile subscriber identity key based on the master session key. In one aspect, encryption component 1135 may obtain an additional master session key, a mobile subscriber identity key, and an additional mobile subscriber identity key based on the master session key.

In one aspect, encryption component 1135 may encrypt the additional mobile subscriber identity based on the additional mobile subscriber identity key, where the authentication information response includes the encrypted additional mobile subscriber identity and the additional master session key. In another aspect, encryption component 1135 may encrypt the mobile subscriber identity key based on the additional mobile subscriber identity key and encrypt the additional mobile subscriber identity based on the mobile subscriber identity key, where the authentication information response includes the encrypted mobile subscriber identity key, the encrypted additional mobile subscriber identity, and the additional master session key. In one aspect, encryption component 1135 may encrypt the IMSI.

PMSI update component 1140 may obtain a subsequent version of the additional mobile subscriber identity, where the additional mobile subscriber identity is associated with a first index and the subsequent version of the additional mobile subscriber identity is associated with a second index. In some cases, the subsequent version of the additional mobile subscriber identity is derived from the additional mobile subscriber identity.

PMSI attach component 1145 may receive a subsequent authentication information request including the additional mobile subscriber identity. IMSI request component 1150 may receive an IMSI request including the additional mobile subscriber identity and transmit an IMSI response including the additional mobile subscriber identity and the encrypted IMSI. In some cases, at least a portion of the IMSI request or the IMSI response is encrypted using an additional master session key.

Figure 12:
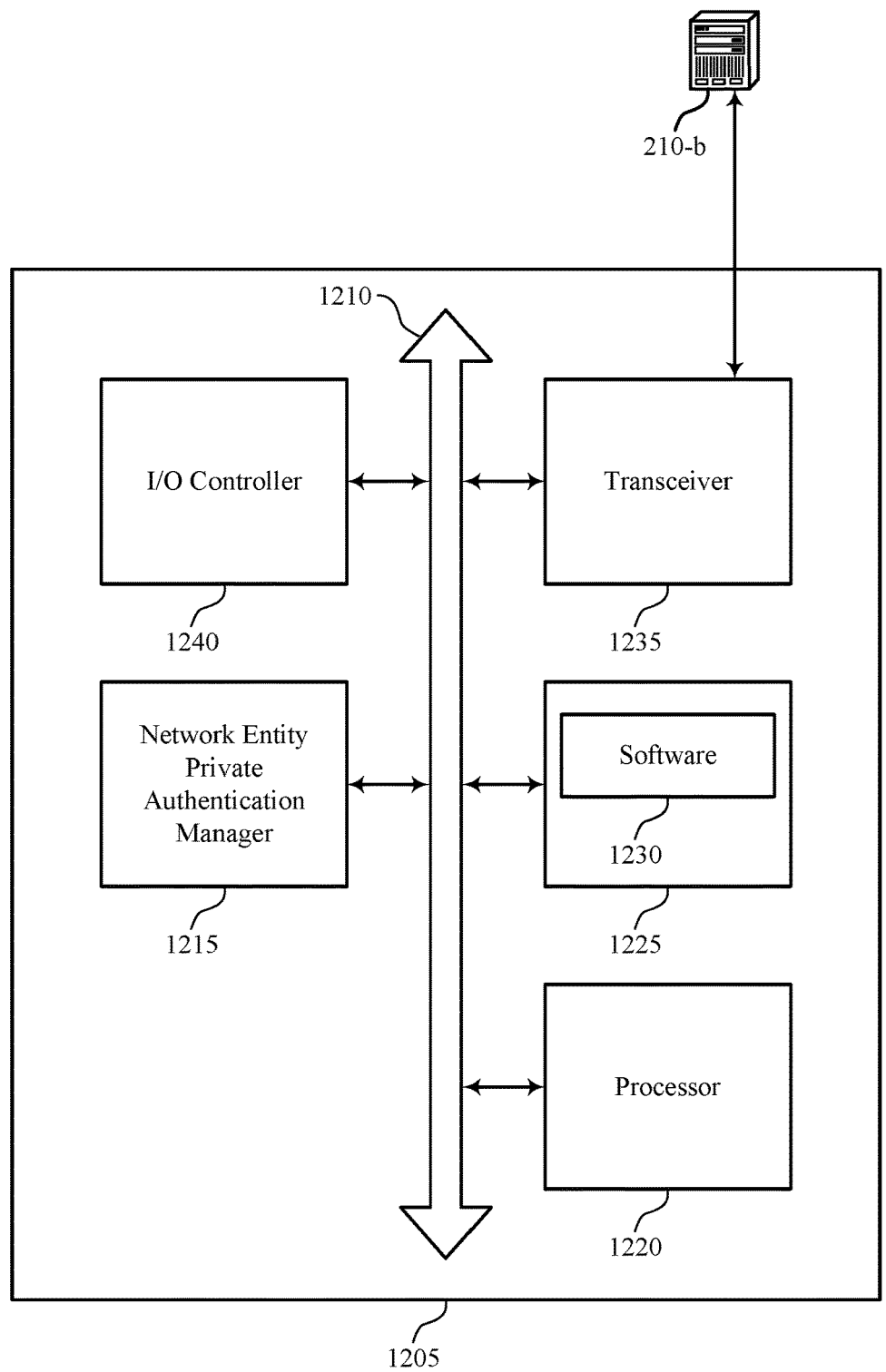
FIG. 12 illustrates a block diagram of a system including a network entity that supports authentication with a privacy identity in accordance with aspects of the present disclosure.

FIG. 12 shows a diagram of a system 1200 including a device 1205 that supports authentication with a privacy identity in accordance with various aspects of the present disclosure. Device 1205 may be an example of or include the components of network entity 130 as described above, e.g., with reference to FIG. 1. Device 1205 may include components for bi-directional voice and data communications including components for transmitting and receiving communications, including network entity private authentication manager 1215, processor 1220, memory 1225, software 1230, transceiver 1235, and I/O controller 1240. These components may be in electronic communication via one or more busses (e.g., bus 1210).

Network entity private authentication manager 1215 may be an example of aspects of the network entity private authentication manager 915 described with reference to FIG. 9. Network entity private authentication manager 1215 may, in combination with transceiver 1235, for example, receive an authentication information request including an IMSI and an initialization request for an additional mobile subscriber identity. Network entity private authentication manager 1215 may, in combination with transceiver 1235, for example, transmit an authentication information response based on the initialization request for the additional mobile subscriber identity, where the authentication information response includes the additional mobile subscriber identity. Network entity private authentication manager 1215 may, in combination with transceiver 1235, for example, may also receive an acknowledgement for the additional mobile subscriber identity based on the authentication information response.

Processor 1220 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting authentication with a privacy identity).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a Basic Input-Output system (BIOS) which may control basic hardware and/or software operation such as the interaction with peripheral components or devices.

Software 1230 may include code to implement aspects of the present disclosure, including code to support authentication with a privacy identity. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

I/O controller 1240 may manage input and output signals for device 1205. I/O controller 1240 may also manage peripherals not integrated into device 1205. In some cases, I/O controller 1240 may represent a physical connection or port to an external peripheral. In some cases, I/O controller 1240 may utilize an operating system such as iOS®, ANDROID®, MS-DOS®, MS-WINDOWS®, OS/2®, UNIX®, LINUX®, or another known operating system.

Figure 13:
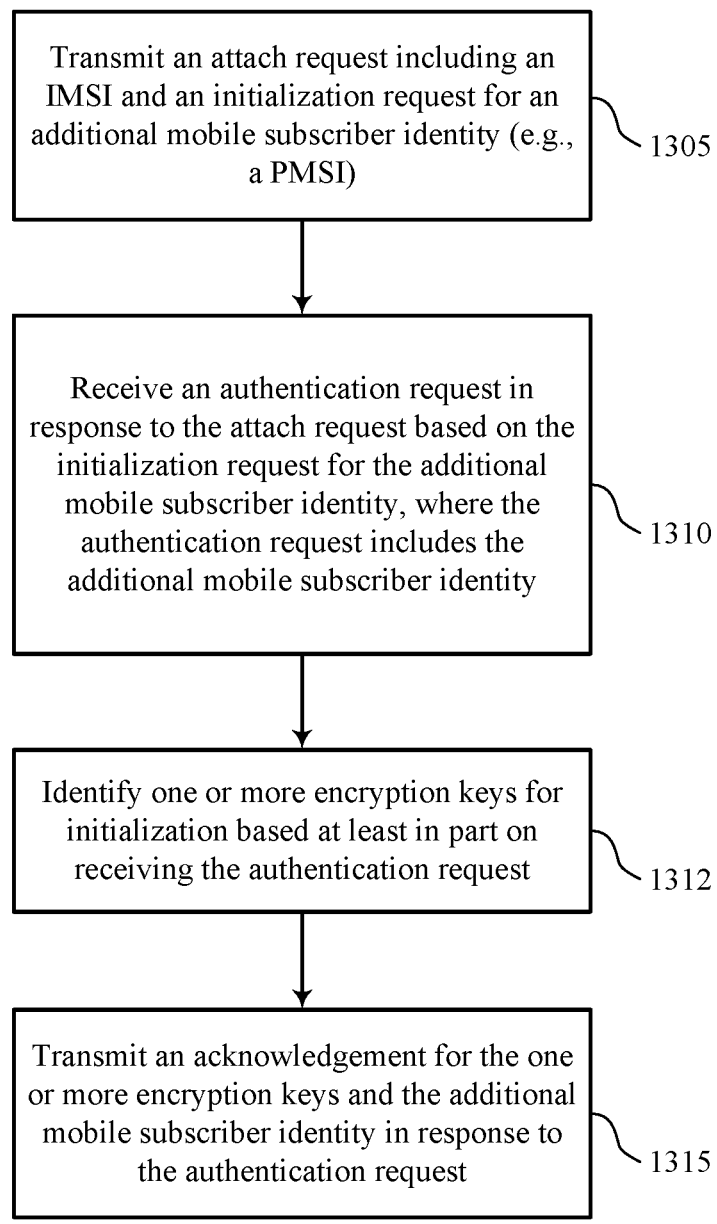
FIGS. 13 through 19 illustrate methods for authentication with a privacy identity in accordance with aspects of the present disclosure.

FIG. 13 shows a flowchart illustrating a method 1300 for authentication with a privacy identity in accordance with various aspects of the present disclosure. The operations of method 1300 may be implemented by a UE 115 or its components as described herein. For example, the operations of method 1300 may be performed by a UE private authentication manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1305 the UE 115 may transmit an attach request (e.g., a NAS attach request) comprising an IMSI and an initialization request for an additional mobile subscriber identity. The operations of block 1305 may be performed according to the methods described with reference to FIGS. 1 through 4. In certain examples, aspects of the operations of block 1305 may be performed by a PMSI initialization component as described with reference to FIGS. 5 through 8.

At block 1310 the UE 115 may receive an authentication request (e.g., a NAS authentication request) in response to the attach request based at least in part on the initialization request for the additional mobile subscriber identity, wherein the authentication request comprises the additional mobile subscriber identity. The operations of block 1310 may be performed according to the methods described with reference to FIGS. 1 through 4. In certain examples, aspects of the operations of block 1310 may be performed by a PMSI authentication component as described with reference to FIGS. 5 through 8.

At block 1312 the UE 115 may identify one or more encryption keys for initialization based at least in part on receiving the authentication request. The operations of block 1312 may be performed according to the methods described with reference to FIGS. 1 through 4. In certain examples, aspects of the operations of block 1312 may be performed by a PMSI acknowledgement component as described with reference to FIGS. 5 through 8.

At block 1315 the UE 115 may transmit an acknowledgement for the additional mobile subscriber identity in response to the authentication request (e.g., the NAS authentication request). The operations of block 1315 may be performed according to the methods described with reference to FIGS. 1 through 4. In certain examples, aspects of the operations of block 1315 may be performed by a PMSI acknowledgement component as described with reference to FIGS. 5 through 8.

Figure 14:
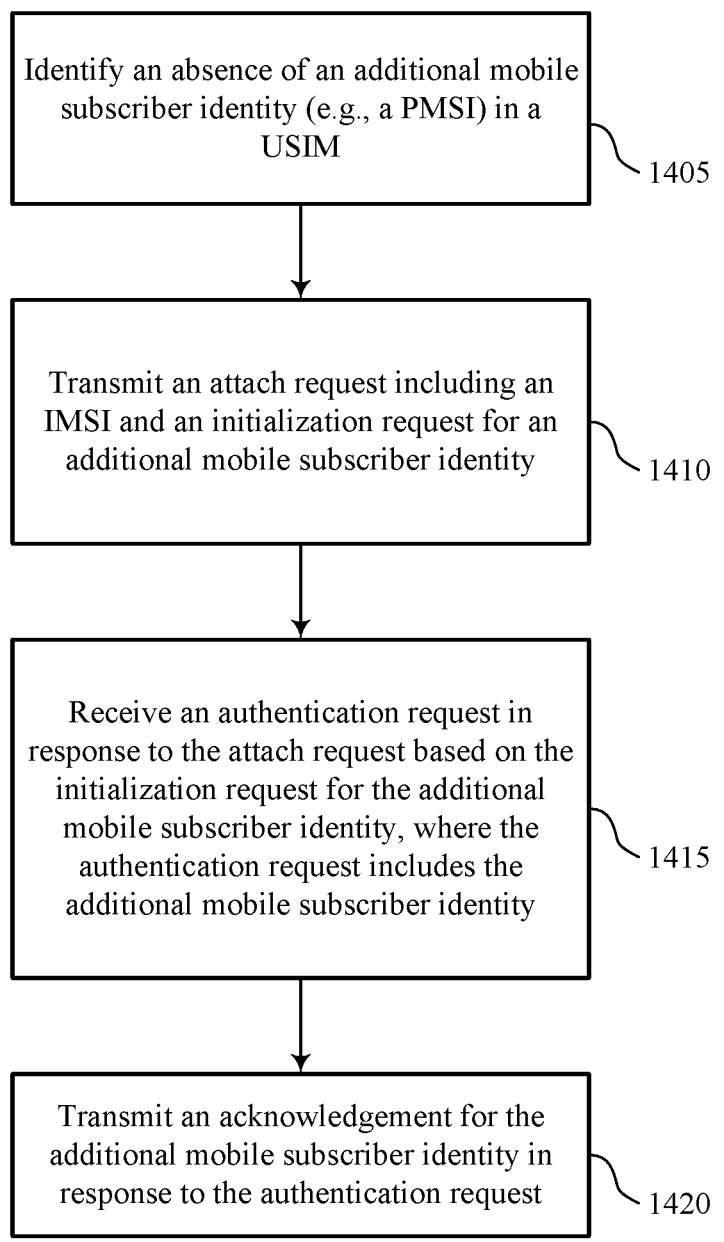

FIG. 14 shows a flowchart illustrating a method 1400 for authentication with a privacy identity in accordance with various aspects of the present disclosure. The operations of method 1400 may be implemented by a UE 115 or its components as described herein. For example, the operations of method 1400 may be performed by a UE private authentication manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1405 the UE 115 may identify an absence of the additional mobile subscriber identity (e.g., a PMSI) in a universal subscriber identity module (USIM). The operations of block 1405 may be performed according to the methods described with reference to FIGS. 1 through 4. In certain examples, aspects of the operations of block 1405 may be performed by a privacy module as described with reference to FIGS. 5 through 8.

At block 1410 the UE 115 may transmit an attach request (e.g., a NAS attach request) comprising an IMSI and an initialization request for an additional mobile subscriber identity. The attach request may be transmitted based at least in part on the absence of the additional mobile subscriber identity. The operations of block 1410 may be performed according to the methods described with reference to FIGS. 1 through 4. In certain examples, aspects of the operations of block 1410 may be performed by a PMSI initialization component as described with reference to FIGS. 5 through 8.

At block 1415 the UE 115 may receive an authentication request (e.g., a NAS authentication request) in response to the attach request based at least in part on the initialization request for the additional mobile subscriber identity, wherein the authentication request comprises the additional mobile subscriber identity. The operations of block 1415 may be performed according to the methods described with reference to FIGS. 1 through 4. In certain examples, aspects of the operations of block 1415 may be performed by a PMSI authentication component as described with reference to FIGS. 5 through 8.

At block 1420 the UE 115 may transmit an acknowledgement for the additional mobile subscriber identity in response to the authentication request (e.g., a NAS authentication request). The operations of block 1420 may be performed according to the methods described with reference to FIGS. 1 through 4. In certain examples, aspects of the operations of block 1420 may be performed by a PMSI acknowledgement component as described with reference to FIGS. 5 through 8.

Figure 15:
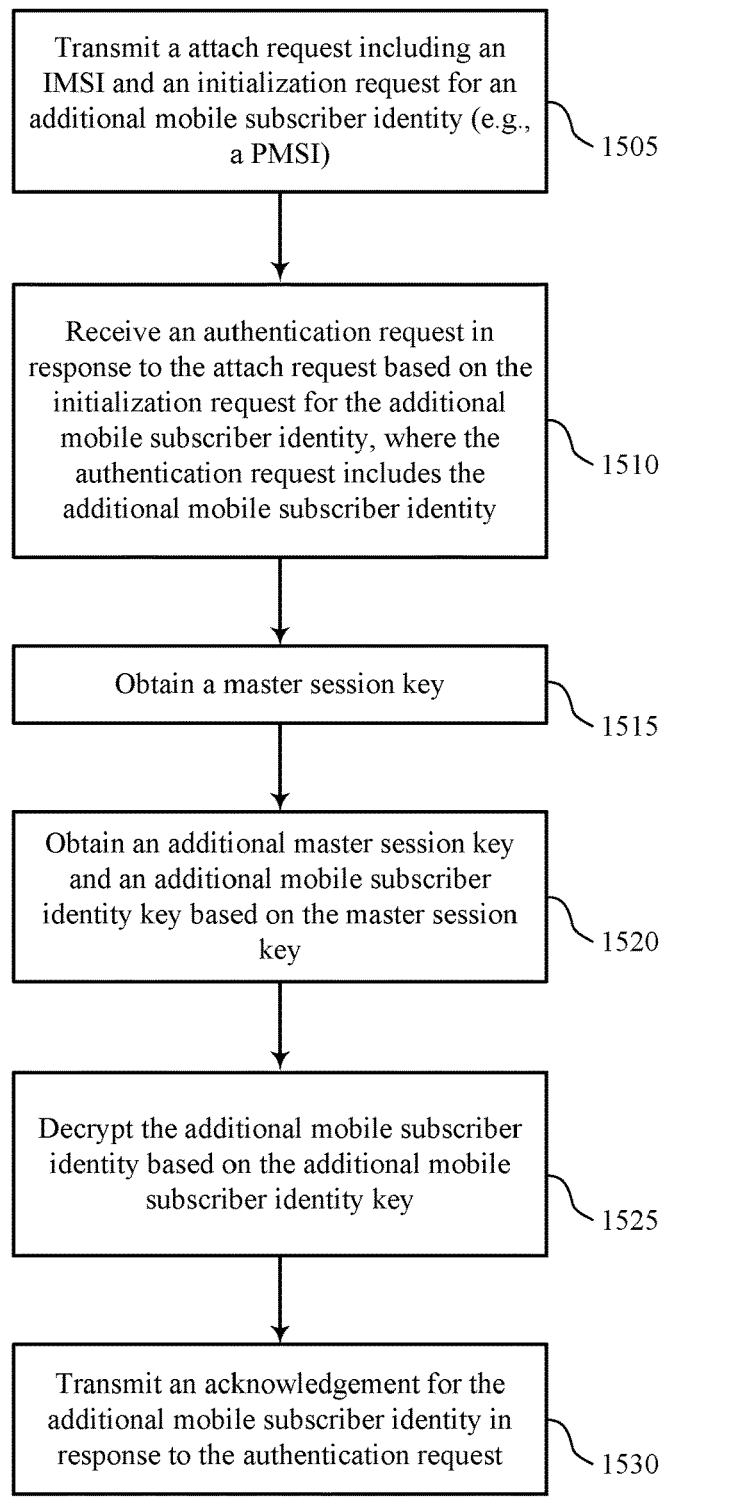

FIG. 15 shows a flowchart illustrating a method 1500 for authentication with a privacy identity in accordance with various aspects of the present disclosure. The operations of method 1500 may be implemented by a UE 115 or its components as described herein. For example, the operations of method 1500 may be performed by a UE private authentication manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1505 the UE 115 may transmit an attach request (e.g., a NAS attach request) comprising an IMSI and an initialization request for an additional mobile subscriber identity. The operations of block 1505 may be performed according to the methods described with reference to FIGS. 1 through 4. In certain examples, aspects of the operations of block 1505 may be performed by a PMSI initialization component as described with reference to FIGS. 5 through 8.

At block 1510 the UE 115 may receive an authentication request (e.g., a NAS authentication request) in response to the attach request based at least in part on the initialization request for the additional mobile subscriber identity, wherein the authentication request comprises the additional mobile subscriber identity. The operations of block 1510 may be performed according to the methods described with reference to FIGS. 1 through 4. In certain examples, aspects of the operations of block 1510 may be performed by a PMSI authentication component as described with reference to FIGS. 5 through 8.

In addition, the UE 115 may identify one or more encryption keys for initialization based at least in part on receiving the authentication request. Identifying the one or more encryption keys for initialize may include the features of blocks 1515 through 1525.

At block 1515 the UE 115 may obtain a master session key. The operations of block 1515 may be performed according to the methods described with reference to FIGS. 1 through 4. In certain examples, aspects of the operations of block 1515 may be performed by a decryption component as described with reference to FIGS. 5 through 8.

At block 1520 the UE 115 may obtain an additional master session key and an additional mobile subscriber identity key based at least in part on the master session key. The operations of block 1520 may be performed according to the methods described with reference to FIGS. 1 through 4. In certain examples, aspects of the operations of block 1520 may be performed by a decryption component as described with reference to FIGS. 5 through 8.

At block 1525 the UE 115 may decrypt the additional mobile subscriber identity based at least in part on the additional mobile subscriber identity key, wherein the acknowledgement is based at least in part on decrypting the additional mobile subscriber identity. The operations of block 1525 may be performed according to the methods described with reference to FIGS. 1 through 4. In certain examples, aspects of the operations of block 1525 may be performed by a decryption component as described with reference to FIGS. 5 through 8.

At block 1530 the UE 115 may transmit an acknowledgement for the additional mobile subscriber identity in response to the authentication request (e.g., the NAS authentication request). The operations of block 1530 may be performed according to the methods described with reference to FIGS. 1 through 4. In certain examples, aspects of the operations of block 1530 may be performed by a PMSI acknowledgement component as described with reference to FIGS. 5 through 8.

Figure 16:
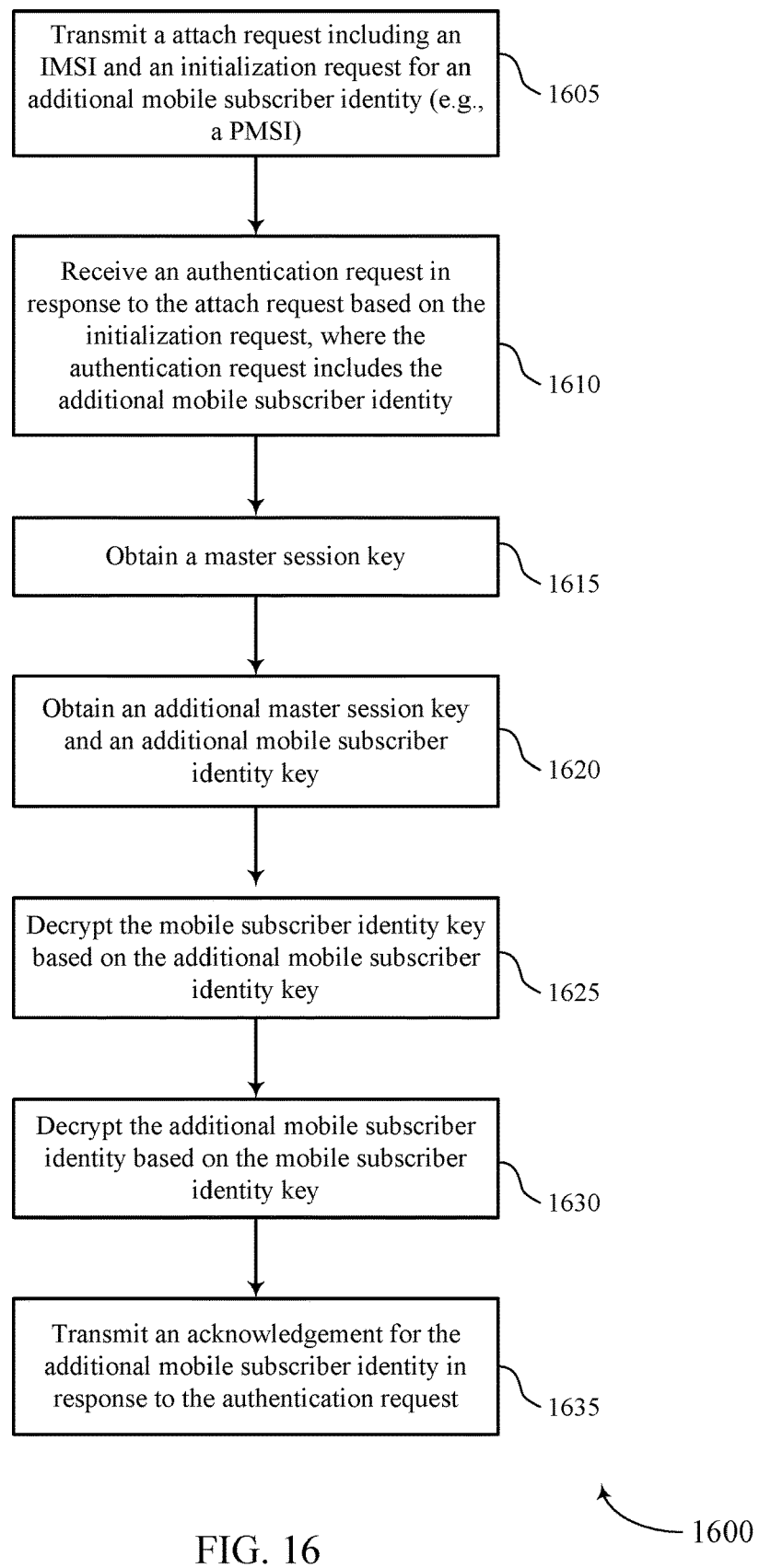

FIG. 16 shows a flowchart illustrating a method 1600 for authentication with a privacy identity in accordance with various aspects of the present disclosure. The operations of method 1600 may be implemented by a UE 115 or its components as described herein. For example, the operations of method 1600 may be performed by a UE private authentication manager as described with reference to FIGS. 5 through 8. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may transmit an attach request (e.g., a NAS attach request) comprising an IMSI and an initialization request for an additional mobile subscriber identity. The operations of block 1605 may be performed according to the methods described with reference to FIGS. 1 through 4. In certain examples, aspects of the operations of block 1605 may be performed by a PMSI initialization component as described with reference to FIGS. 5 through 8.

At block 1610 the UE 115 may receive an authentication request (e.g., a NAS authentication request) in response to the attach request based at least in part on the initialization request for the additional mobile subscriber identity, wherein the authentication request comprises the additional mobile subscriber identity. The operations of block 1610 may be performed according to the methods described with reference to FIGS. 1 through 4. In certain examples, aspects of the operations of block 1610 may be performed by a PMSI authentication component as described with reference to FIGS. 5 through 8.

At blocks 1615 through 1630 the UE 115 may identify one or more encryption keys for initialization based at least in part on receiving the authentication request. Identifying the one or more encryption keys for initialize may include the features of blocks 1615 through 1625.

At block 1615 the UE 115 may obtain a master session key. The operations of block 1615 may be performed according to the methods described with reference to FIGS. 1 through 4. In certain examples, aspects of the operations of block 1615 may be performed by a decryption component as described with reference to FIGS. 5 through 8.

At block 1620 the UE 115 may obtain an additional master session key and an additional mobile subscriber identity key based at least in part on the master session key. The operations of block 1620 may be performed according to the methods described with reference to FIGS. 1 through 4. In certain examples, aspects of the operations of block 1620 may be performed by a decryption component as described with reference to FIGS. 5 through 8.

At block 1625 the UE 115 may decrypt the mobile subscriber identity key based at least in part on the additional mobile subscriber identity key. The operations of block 1625 may be performed according to the methods described with reference to FIGS. 1 through 4. In certain examples, aspects of the operations of block 1625 may be performed by a decryption component as described with reference to FIGS. 5 through 8.

At block 1630 the UE 115 may decrypt the additional mobile subscriber identity based at least in part on the mobile subscriber identity key, wherein the acknowledgement is based at least in part on decrypting the additional mobile subscriber identity. The operations of block 1630 may be performed according to the methods described with reference to FIGS. 1 through 4. In certain examples, aspects of the operations of block 1630 may be performed by a decryption component as described with reference to FIGS. 5 through 8.

At block 1635 the UE 115 may transmit an acknowledgement for the additional mobile subscriber identity in response to the authentication request (e.g., the NAS authentication request). The operations of block 1635 may be performed according to the methods described with reference to FIGS. 1 through 4. In certain examples, aspects of the operations of block 1635 may be performed by a PMSI acknowledgement component as described with reference to FIGS. 5 through 8.

Figure 17:
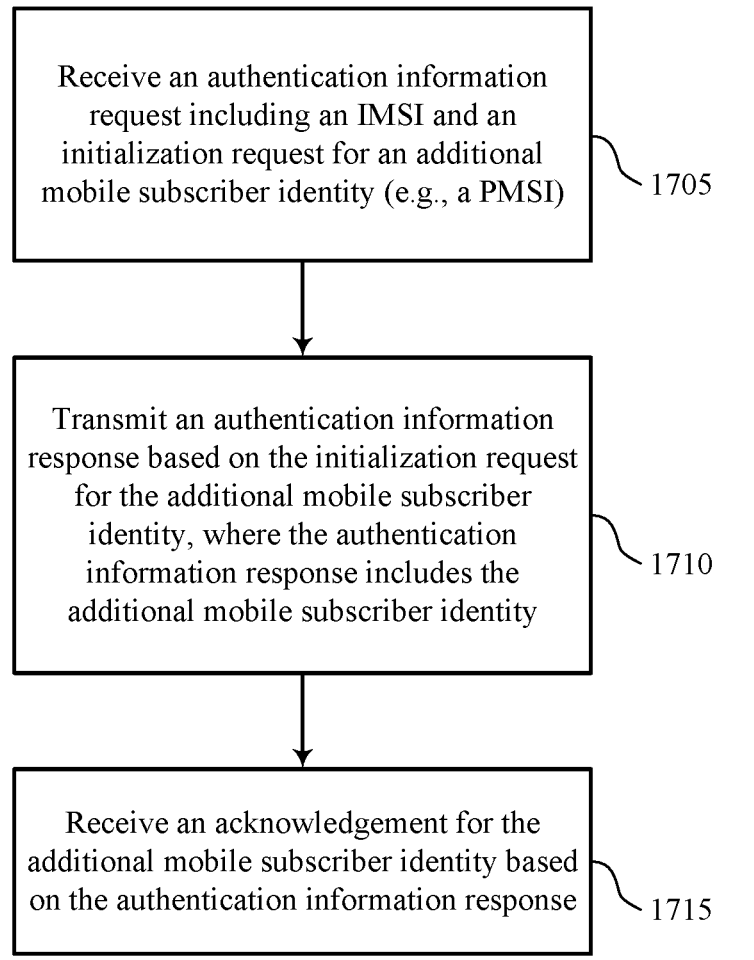

FIG. 17 shows a flowchart illustrating a method 1700 for authentication with a privacy identity in accordance with various aspects of the present disclosure. The operations of method 1700 may be implemented by a network entity 130 or its components as described herein. For example, the operations of method 1700 may be performed by a network entity private authentication manager as described with reference to FIGS. 9 through 12. In some examples, a network entity 130 may execute a set of codes to control the functional elements of the device to perform the functions described below. Additionally or alternatively, the network entity 130 may perform aspects the functions described below using special-purpose hardware.

At block 1705 the network entity 130 may receive an authentication information request comprising an IMSI and an initialization request for an additional mobile subscriber identity. The operations of block 1705 may be performed according to the methods described with reference to FIGS. 1 through 4. In certain examples, aspects of the operations of block 1705 may be performed by a PMSI initialization component as described with reference to FIGS. 9 through 12.

At block 1710 the network entity 130 may transmit an authentication information response based at least in part on the initialization request for the additional mobile subscriber identity, wherein the authentication information response comprises the additional mobile subscriber identity. The operations of block 1710 may be performed according to the methods described with reference to FIGS. 1 through 4. In certain examples, aspects of the operations of block 1710 may be performed by a PMSI authentication component as described with reference to FIGS. 9 through 12.

At block 1715 the network entity 130 may receive an acknowledgement for the additional mobile subscriber identity based at least in part on the authentication information response. The operations of block 1715 may be performed according to the methods described with reference to FIGS. 1 through 4. In certain examples, aspects of the operations of block 1715 may be performed by a PMSI acknowledgement component as described with reference to FIGS. 9 through 12.

Figure 18:
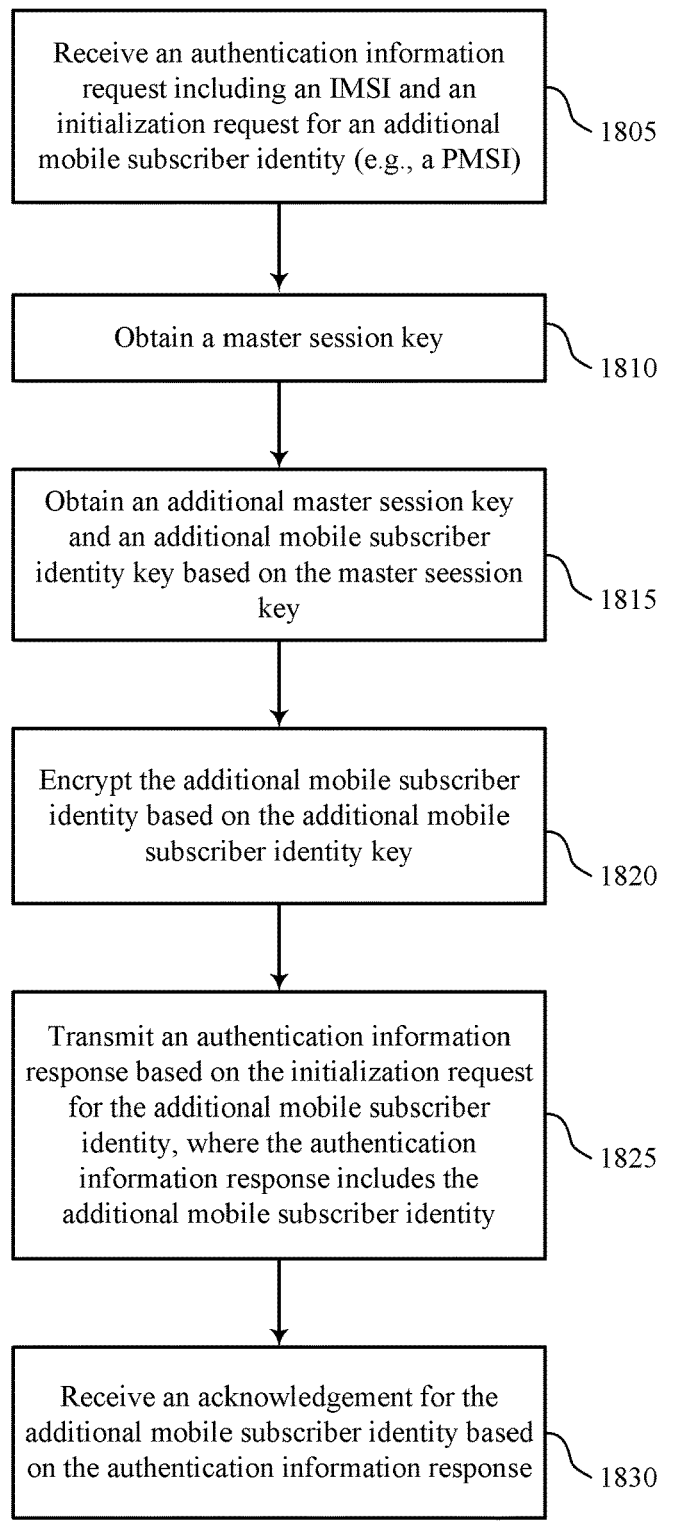

FIG. 18 shows a flowchart illustrating a method 1800 for authentication with a privacy identity in accordance with various aspects of the present disclosure. The operations of method 1800 may be implemented by a network entity 130 or its components as described herein. For example, the operations of method 1800 may be performed by a network entity private authentication manager as described with reference to FIGS. 9 through 12. In some examples, a network entity 130 may execute a set of codes to control the functional elements of the device to perform the functions described below. Additionally or alternatively, the network entity 130 may perform aspects the functions described below using special-purpose hardware.

At block 1805 the network entity 130 may receive an authentication information request comprising an IMSI and an initialization request for an additional mobile subscriber identity. The operations of block 1805 may be performed according to the methods described with reference to FIGS. 1 through 4. In certain examples, aspects of the operations of block 1805 may be performed by a PMSI initialization component as described with reference to FIGS. 9 through 12.

At block 1810 the network entity 130 may obtain a master session key. The operations of block 1810 may be performed according to the methods described with reference to FIGS. 1 through 4. In certain examples, aspects of the operations of block 1810 may be performed by an encryption component as described with reference to FIGS. 9 through 12.

At block 1815 the network entity 130 may obtain an additional master session key and an additional mobile subscriber identity key based at least in part on the master session key. The operations of block 1815 may be performed according to the methods described with reference to FIGS. 1 through 4. In certain examples, aspects of the operations of block 1815 may be performed by an encryption component as described with reference to FIGS. 9 through 12.

At block 1820 the network entity 130 may encrypt the additional mobile subscriber identity based at least in part on the additional mobile subscriber identity key, wherein the authentication information response comprises the encrypted additional mobile subscriber identity and the additional master session key. The operations of block 1820 may be performed according to the methods described with reference to FIGS. 1 through 4. In certain examples, aspects of the operations of block 1820 may be performed by an encryption component as described with reference to FIGS. 9 through 12.

At block 1825 the network entity 130 may transmit an authentication information response based at least in part on the initialization request for the additional mobile subscriber identity, wherein the authentication information response comprises the additional mobile subscriber identity. The subscriber identity may be encrypted. The operations of block 1825 may be performed according to the methods described with reference to FIGS. 1 through 4. In certain examples, aspects of the operations of block 1825 may be performed by a PMSI authentication component as described with reference to FIGS. 9 through 12.

At block 1830 the network entity 130 may receive an acknowledgement for the additional mobile subscriber identity based at least in part on the authentication information response. The operations of block 1830 may be performed according to the methods described with reference to FIGS. 1 through 4. In certain examples, aspects of the operations of block 1830 may be performed by a PMSI acknowledgement component as described with reference to FIGS. 9 through 12.

Figure 19:
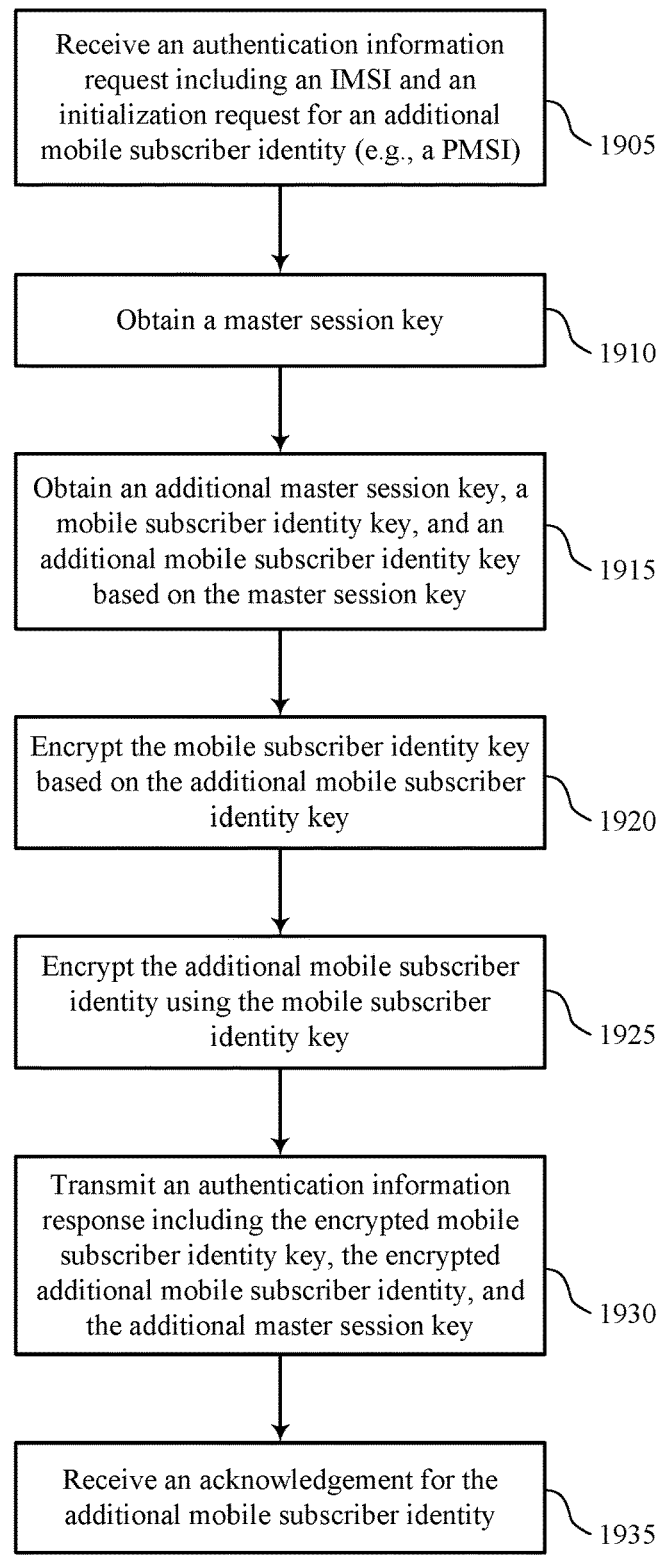

FIG. 19 shows a flowchart illustrating a method 1900 for authentication with a privacy identity in accordance with various aspects of the present disclosure. The operations of method 1900 may be implemented by a network entity 130 or its components as described herein. For example, the operations of method 1900 may be performed by a network entity private authentication manager as described with reference to FIGS. 9 through 12. In some examples, a network entity 130 may execute a set of codes to control the functional elements of the device to perform the functions described below. Additionally or alternatively, the network entity 130 may perform aspects the functions described below using special-purpose hardware.

At block 1905 the network entity 130 may receive an authentication information request comprising an IMSI and an initialization request for an additional mobile subscriber identity. The operations of block 1905 may be performed according to the methods described with reference to FIGS. 1 through 4. In certain examples, aspects of the operations of block 1905 may be performed by a PMSI initialization component as described with reference to FIGS. 9 through 12.

At block 1910 the network entity 130 may obtain a master session key. The operations of block 1910 may be performed according to the methods described with reference to FIGS. 1 through 4. In certain examples, aspects of the operations of block 1910 may be performed by an encryption component as described with reference to FIGS. 9 through 12.

At block 1915 the network entity 130 may obtain an additional master session key, a mobile subscriber identity key, and an additional mobile subscriber identity key based at least in part on the master session key. The operations of block 1915 may be performed according to the methods described with reference to FIGS. 1 through 4. In certain examples, aspects of the operations of block 1915 may be performed by an encryption component as described with reference to FIGS. 9 through 12.

At block 1920 the network entity 130 may encrypt the mobile subscriber identity key based at least in part on the additional mobile subscriber identity key. The operations of block 1920 may be performed according to the methods described with reference to FIGS. 1 through 4. In certain examples, aspects of the operations of block 1920 may be performed by an encryption component as described with reference to FIGS. 9 through 12.

At block 1925 the network entity 130 may encrypt the additional mobile subscriber identity based at least in part on the mobile subscriber identity key. The operations of block 1925 may be performed according to the methods described with reference to FIGS. 1 through 4. In certain examples, aspects of the operations of block 1925 may be performed by an encryption component as described with reference to FIGS. 9 through 12.

At block 1930 the network entity 130 may transmit an authentication information response based at least in part on the initialization request for the additional mobile subscriber identity, wherein the authentication information response comprises the encrypted mobile subscriber identity key, the encrypted next mobile subscriber identity, and the additional master session key. The operations of block 1930 may be performed according to the methods described with reference to FIGS. 1 through 4. In certain examples, aspects of the operations of block 1930 may be performed by a PMSI authentication component as described with reference to FIGS. 9 through 12.

At block 1935 the network entity 130 may receive an acknowledgement for the additional mobile subscriber identity based at least in part on the authentication information response. The operations of block 1935 may be performed according to the methods described with reference to FIGS. 1 through 4. In certain examples, aspects of the operations of block 1935 may be performed by a PMSI acknowledgement component as described with reference to FIGS. 9 through 12.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications, including next-generation or 5G networks.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a device, comprising:
    transmitting an attach request comprising an international mobile subscriber identity (IMSI) and an initialization request for an additional mobile subscriber identity, wherein the attach request is transmitted based at least in part on an absence of the additional mobile subscriber identity in a universal subscriber identity module (USIM) and the USIM does not support the additional mobile subscriber identity;
    receiving an authentication request in response to the attach request based at least in part on the initialization request for the additional mobile subscriber identity, wherein the authentication request comprises the additional mobile subscriber identity;
    identifying one or more encryption keys for initialization based at least in part on receiving the authentication request; and
    transmitting an acknowledgement for the additional mobile subscriber identity in response to the authentication request.

2. The method of claim 1, wherein the USIM is configured for operation according to at least one of Universal Mobile Telecommunications System (UMTS), Long Term Evolution (LTE), or LTE-Advanced (LTE-A).

3. The method of claim 1, wherein the USIM is configured for operation according to a next generation mobile network other than Universal Mobile Telecommunications System (UMTS), Long Term Evolution (LTE), or LTE-Advanced (LTE-A).

4. The method of claim 1, wherein identifying the one or more encryption keys for initialization comprises:
    obtaining a master session key;
    obtaining an additional master session key and an additional mobile subscriber identity key based at least in part on the master session key; and
    decrypting the additional mobile subscriber identity based at least in part on the additional mobile subscriber identity key, wherein the acknowledgement is based at least in part on decrypting the additional mobile subscriber identity.

5. The method of claim 4, wherein the master session key is obtained based at least in part on a shared root key of the device and a network entity.

6. The method of claim 1, wherein the authentication request comprises a mobile subscriber identity key, and identifying the one or more encryption keys for initialization comprises:
    obtaining a master session key;
    obtaining an additional master session key and an additional mobile subscriber identity key based at least in part on the master session key;
    decrypting the mobile subscriber identity key based at least in part on the additional mobile subscriber identity key; and
    decrypting the additional mobile subscriber identity based at least in part on the mobile subscriber identity key, wherein the acknowledgement is based at least in part on decrypting the additional mobile subscriber identity.

7. The method of claim 6, wherein the authentication request comprises an encrypted version of the mobile subscriber identity key.

8. The method of claim 1, further comprising:
    obtaining a subsequent version of the additional mobile subscriber identity, wherein the additional mobile subscriber identity is associated with a first index and the subsequent version of the additional mobile subscriber identity is associated with a second index.

9. The method of claim 8, wherein the subsequent version of the additional mobile subscriber identity is derived from the additional mobile subscriber identity.

10. The method of claim 8, wherein the additional mobile subscriber identity is a single use identity.

11. The method of claim 1, further comprising:
    transmitting a subsequent attach request comprising the additional mobile subscriber identity.

12. The method of claim 1, further comprising:
    receiving an indication of a temporary mobile subscriber identity (TMSI).

13. The method of claim 1, further comprising:
    storing the additional mobile subscriber identity in a non-volatile memory.

14. The method of claim 1, wherein the additional mobile subscriber identity comprises a privacy mobile subscriber identity (PMSI).

15. The method of claim 1, wherein the authentication request comprises an encrypted version of the additional mobile subscriber identity.

16. An apparatus for wireless communication, comprising:
- means for transmitting an attach request comprising an international mobile subscriber identity (IMSI) and an initialization request for an additional mobile subscriber identity, wherein the attach request is transmitted based at least in part on an absence of the additional mobile subscriber identity in a universal subscriber identity module (USIM) and the USIM does not support the additional mobile subscriber identity;
- means for receiving an authentication request in response to the attach request based at least in part on the initialization request for the additional mobile subscriber identity, wherein the authentication request comprises the additional mobile subscriber identity;
- means for identifying one or more encryption keys for initialization based at least in part on receiving the authentication request; and
- means for transmitting an acknowledgement for the additional mobile subscriber identity in response to the authentication request.

17. The apparatus of claim 16, further comprising:
- means for obtaining a master session key;
- means for obtaining an additional master session key and an additional mobile subscriber identity key based at least in part on the master session key; and
- means for decrypting the additional mobile subscriber identity based at least in part on the additional mobile subscriber identity key, wherein the means for transmitting the acknowledgement is operable based at least in part on decrypting the additional mobile subscriber identity.

18. An apparatus for wireless communication, comprising:
- a processor;
- memory in electronic communication with the processor; and
- instructions stored in the memory and operable, when executed by the processor, to cause the apparatus to:
- transmit an attach request comprising an international mobile subscriber identity (IMSI) and an initialization request for an additional mobile subscriber identity, wherein the attach request is transmitted based at least in part on an absence of the additional mobile subscriber identity in a universal subscriber identity module (USIM) and the USIM does not support the additional mobile subscriber identity;
- receive an authentication request in response to the attach request based at least in part on the initialization request for the additional mobile subscriber identity, wherein the authentication request comprises the additional mobile subscriber identity;
- identify one or more encryption keys for initialization based at least in part on receiving the authentication request; and
- transmit an acknowledgement for the additional mobile subscriber identity in response to the authentication request.

19. The apparatus of claim 18, wherein the instructions are further executable by the processor to cause the apparatus to:
- obtain a master session key;
- obtain an additional master session key and an additional mobile subscriber identity key based at least in part on the master session key; and
- decrypt the additional mobile subscriber identity based at least in part on the additional mobile subscriber identity key, wherein the acknowledgement is based at least in part on decrypting the additional mobile subscriber identity.

\* \* \* \* \*